Sept. 22, 1936.  G. O. GRIDLEY ET AL  2,055,434
METALWORKING MACHINE
Filed Sept. 21, 1929  12 Sheets-Sheet 3
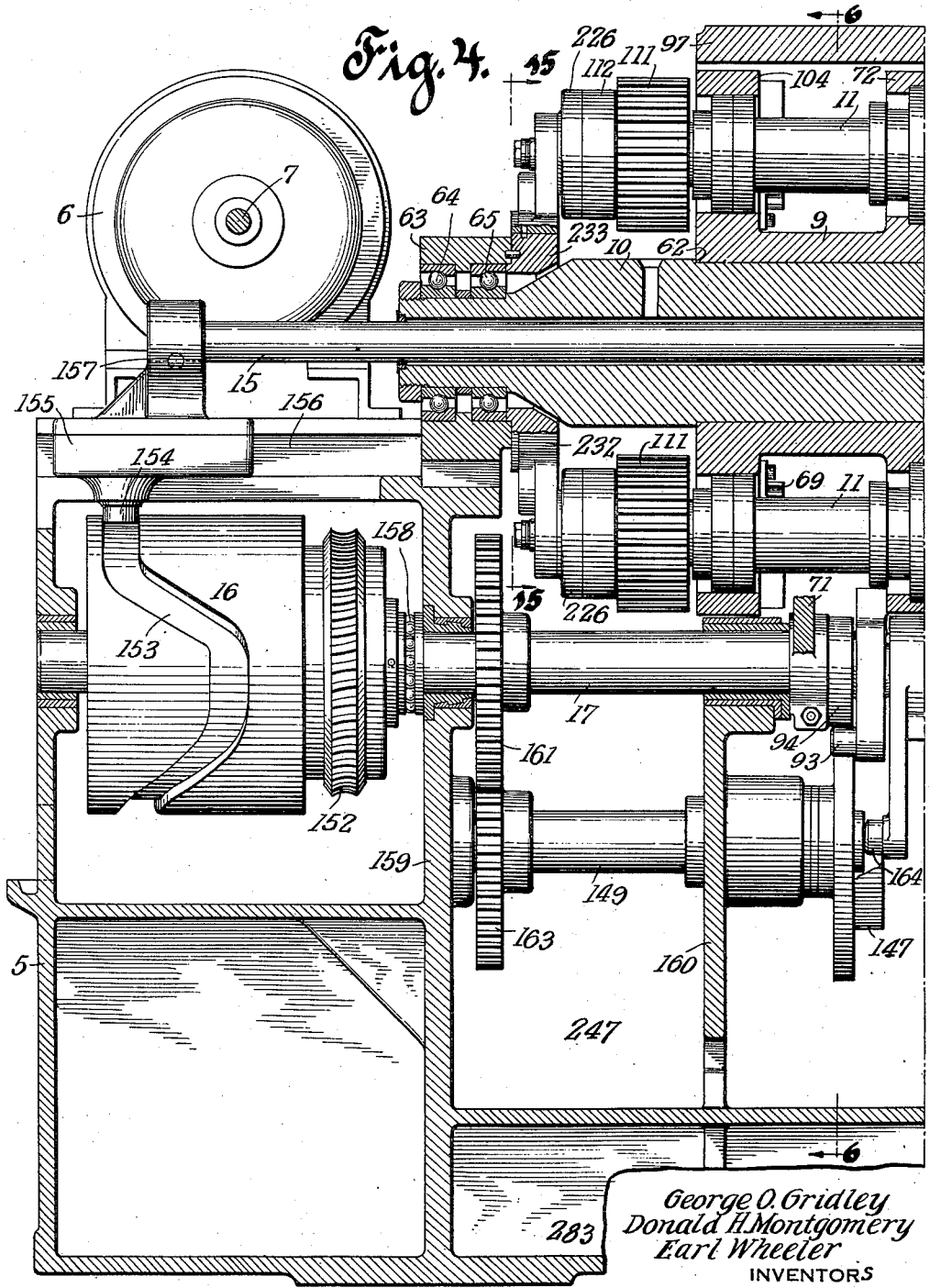
George O. Gridley
Donald H. Montgomery
Earl Wheeler
INVENTORS
ATTORNEYS

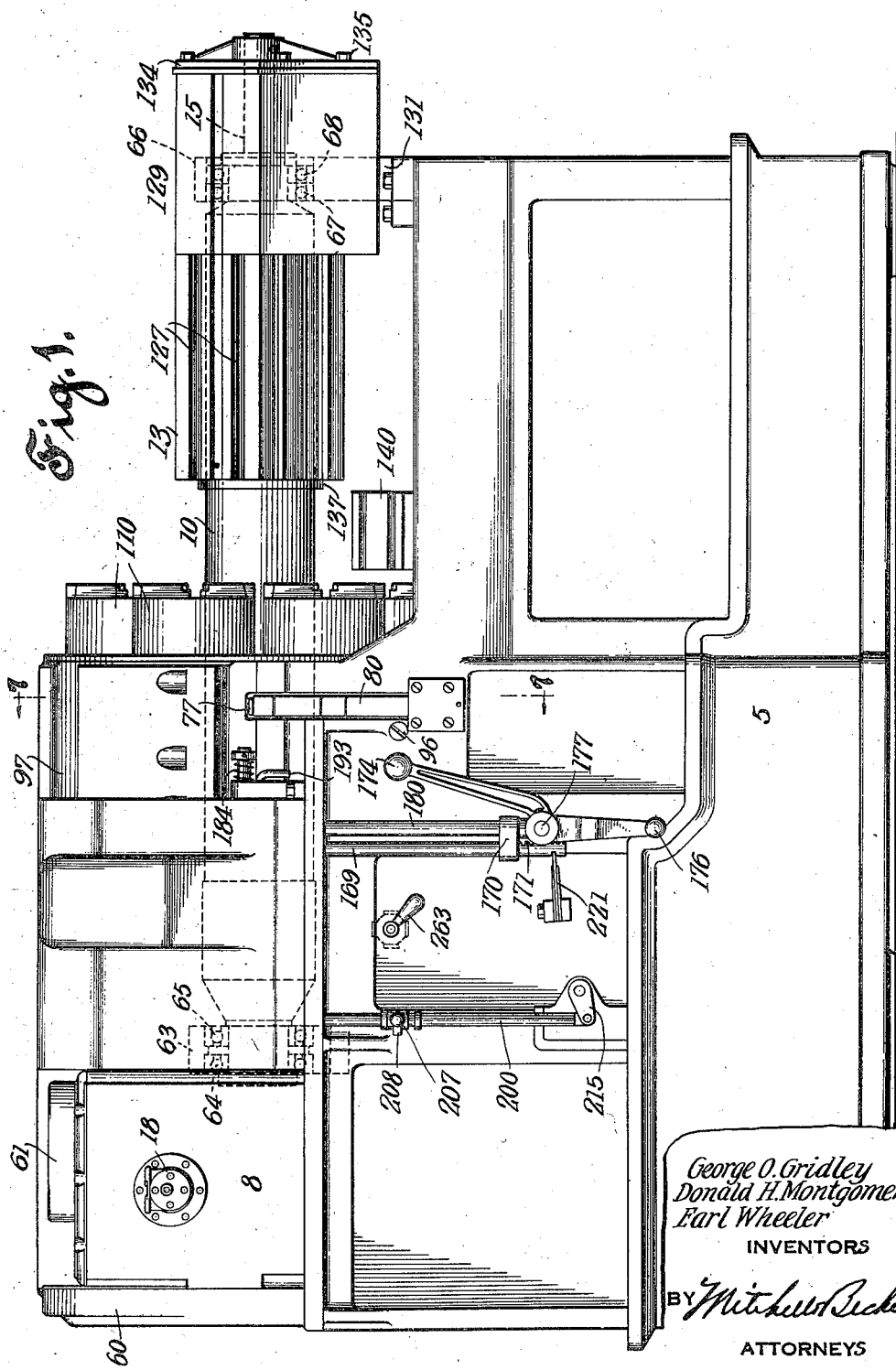

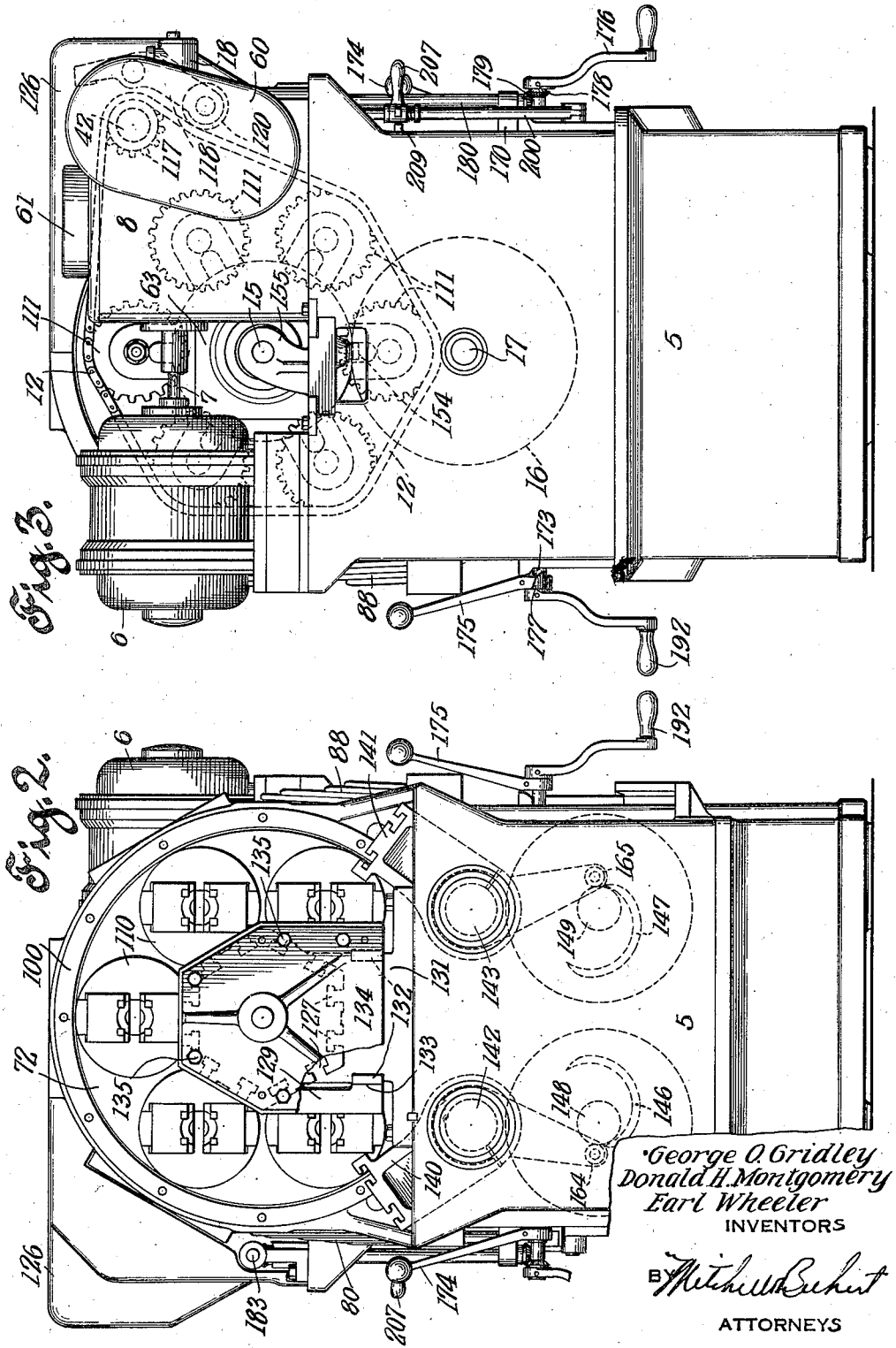

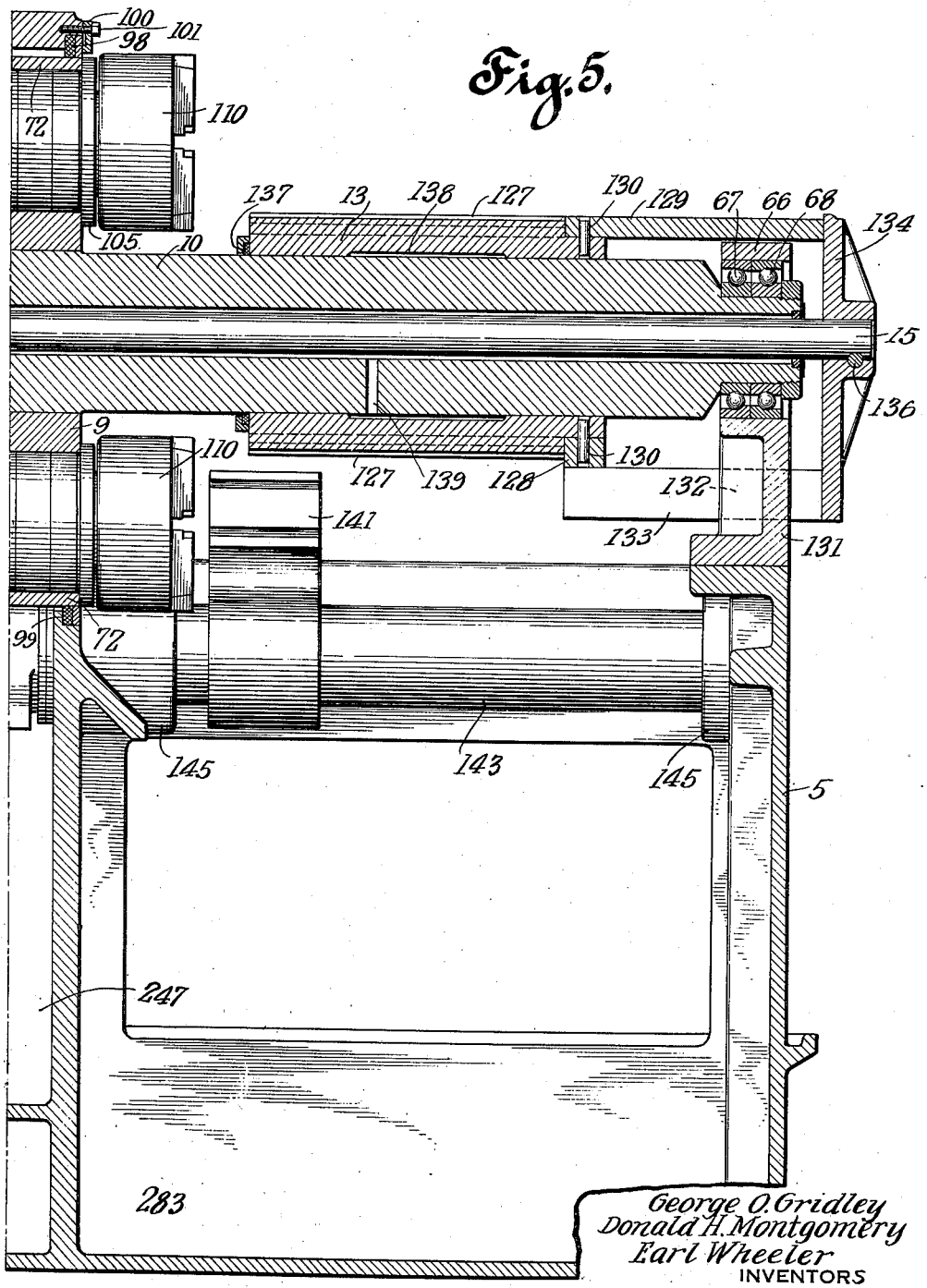

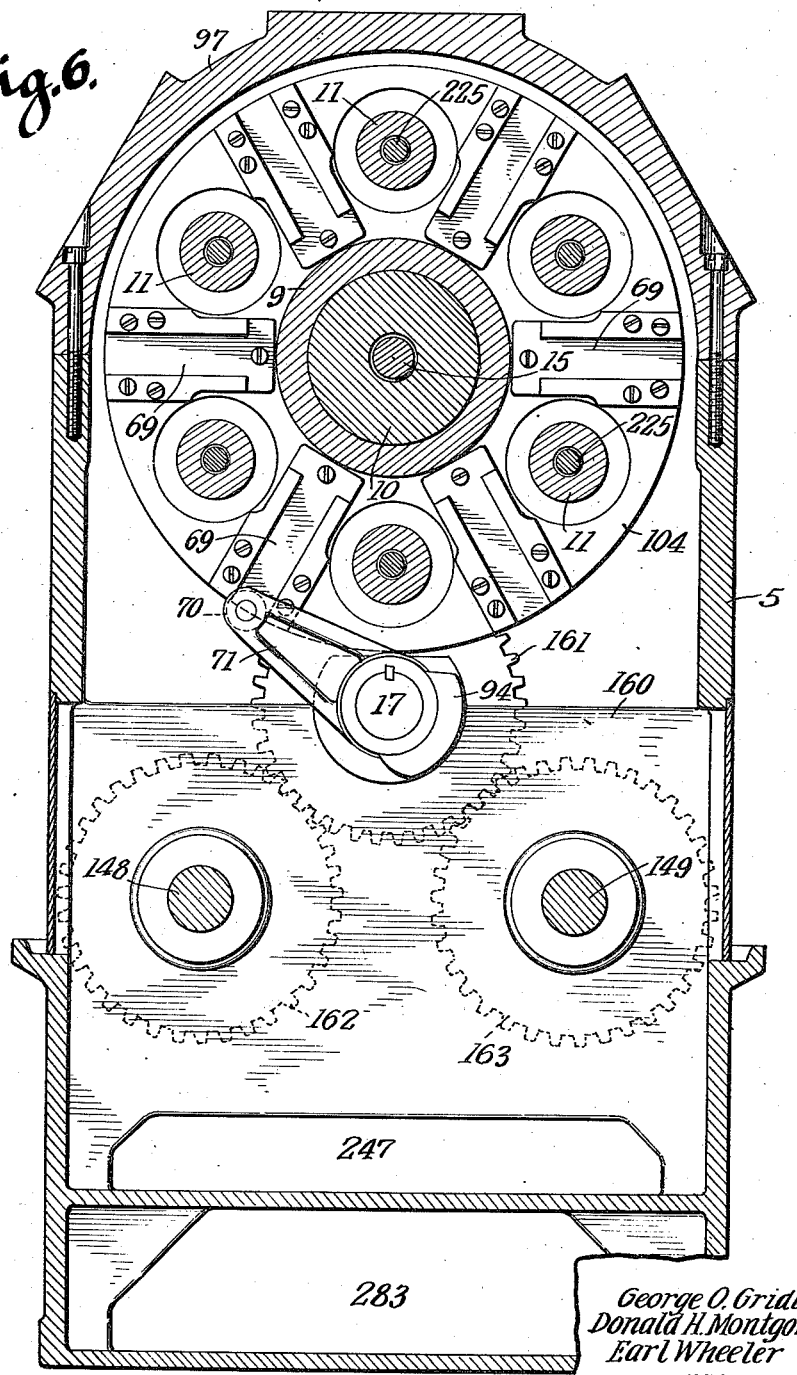

Sept. 22, 1936.  G. O. GRIDLEY ET AL  2,055,434
METALWORKING MACHINE
Filed Sept. 21, 1929  12 Sheets-Sheet 6
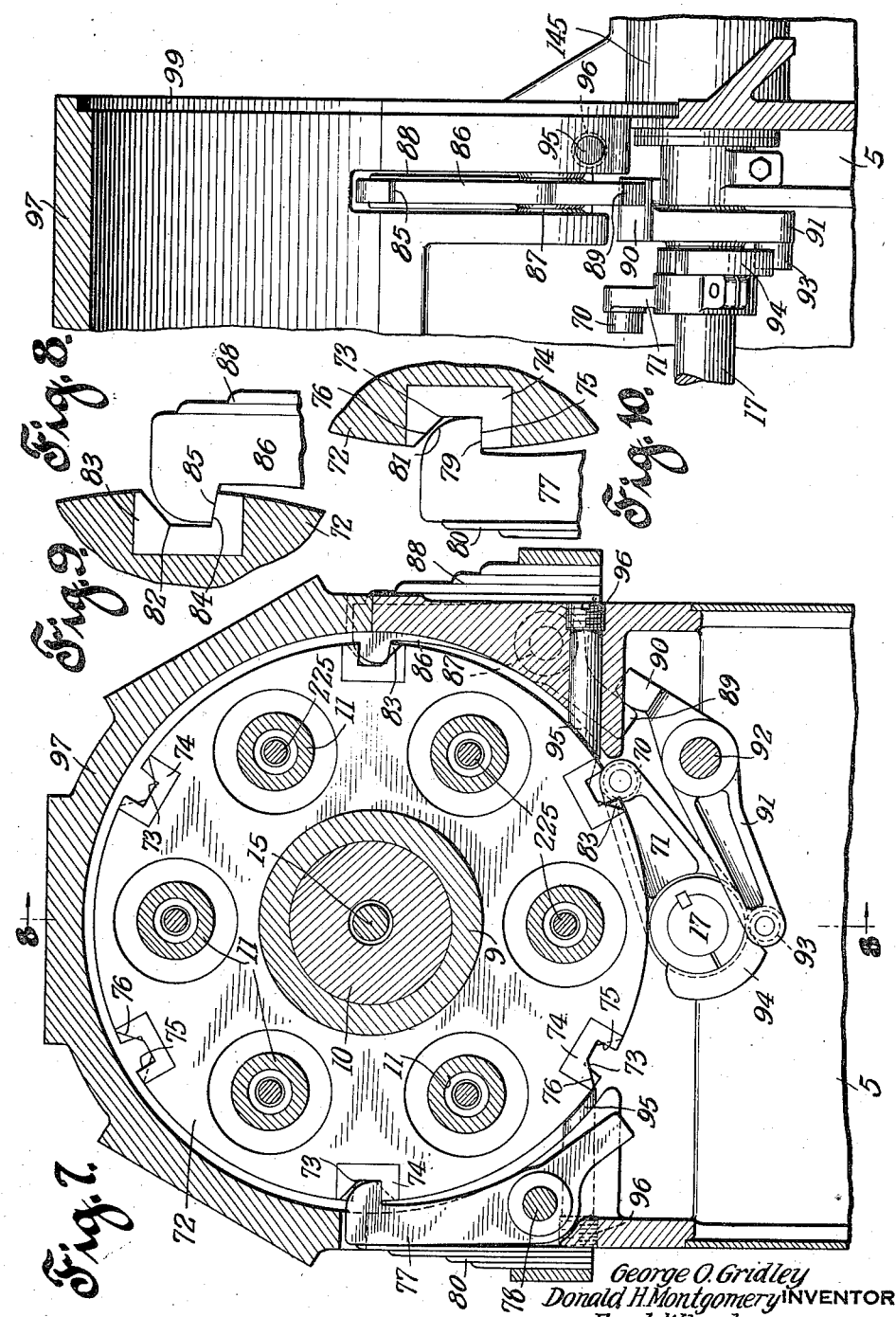

Sept. 22, 1936.  G. O. GRIDLEY ET AL  2,055,434
METALWORKING MACHINE
Filed Sept. 21, 1929  12 Sheets-Sheet 7

George O. Gridley
Donald H. Montgomery
Earl Wheeler
INVENTORS

BY
ATTORNEYS

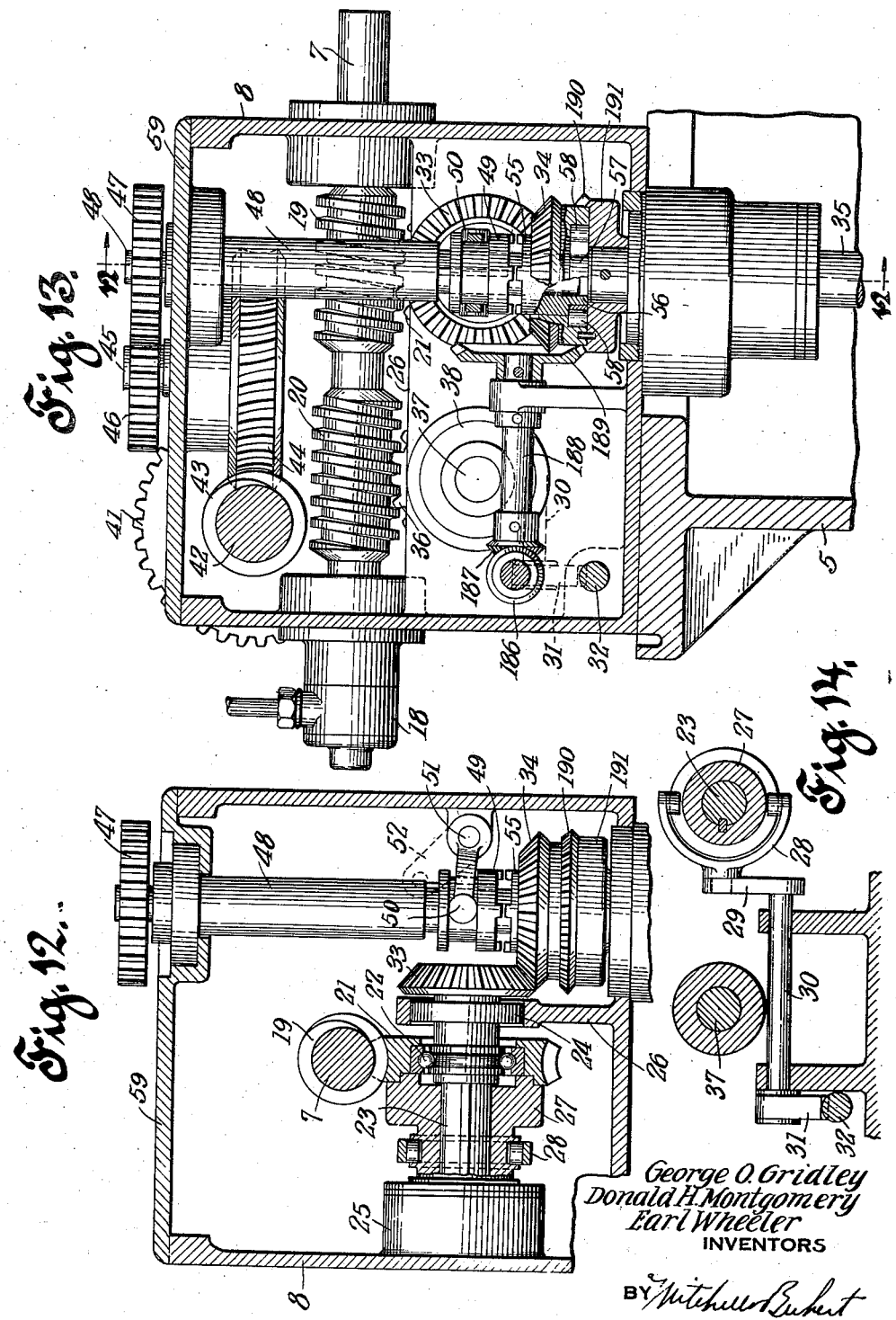

Sept. 22, 1936.	G. O. GRIDLEY ET AL	2,055,434
METALWORKING MACHINE
Filed Sept. 21, 1929	12 Sheets-Sheet 9

George O. Gridley
Donald H. Montgomery
Earl Wheeler
INVENTORS

ATTORNEYS

Sept. 22, 1936. G. O. GRIDLEY ET AL 2,055,434
METALWORKING MACHINE
Filed Sept. 21, 1929 12 Sheets-Sheet 10
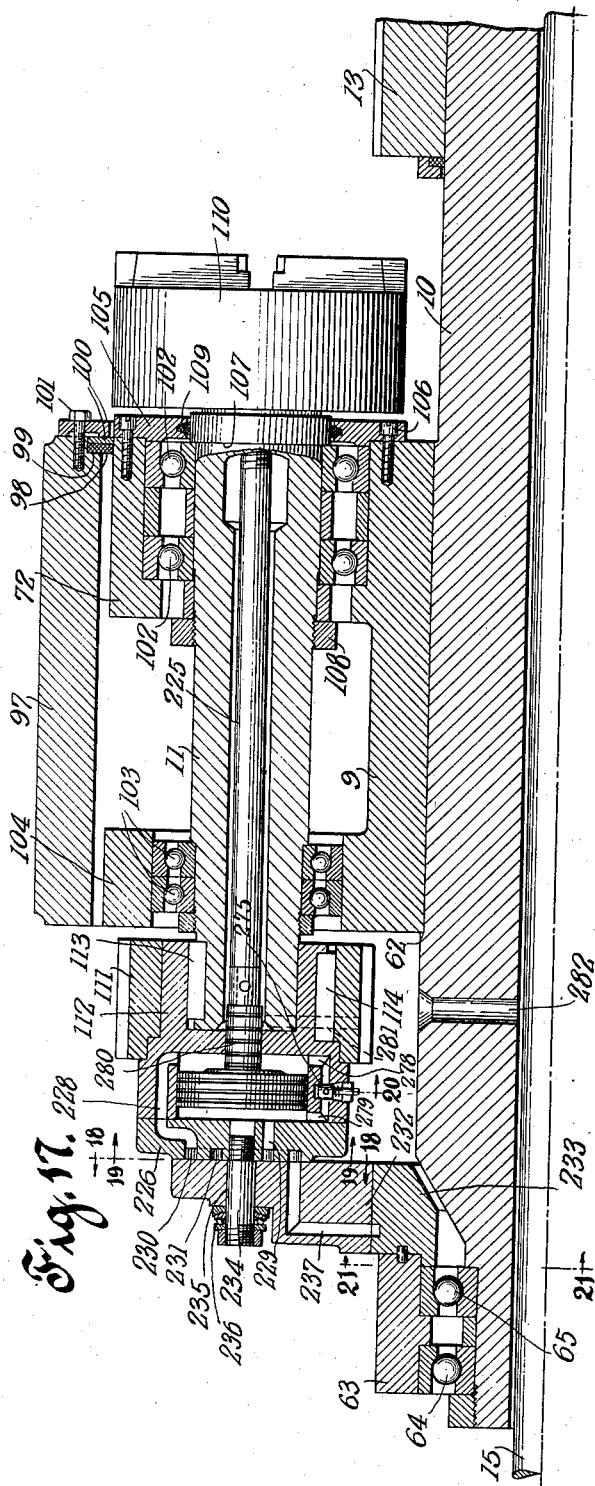
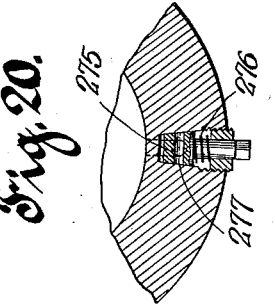
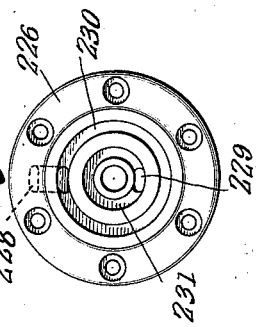
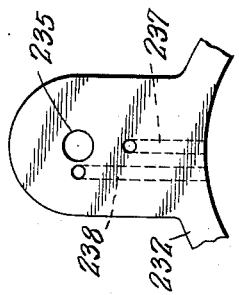
George O. Gridley
Donald H. Montgomery
Earl Wheeler
INVENTORS
BY
ATTORNEYS Sept. 22, 1936.　　G. O. GRIDLEY ET AL　　2,055,434
METALWORKING MACHINE
Filed Sept. 21, 1929　　12 Sheets-Sheet 11

George O. Gridley
Donald H. Montgomery
Earl Wheeler
INVENTORS

ATTORNEYS

Sept. 22, 1936.    G. O. GRIDLEY ET AL    2,055,434
METALWORKING MACHINE
Filed Sept. 21, 1929    12 Sheets-Sheet 12
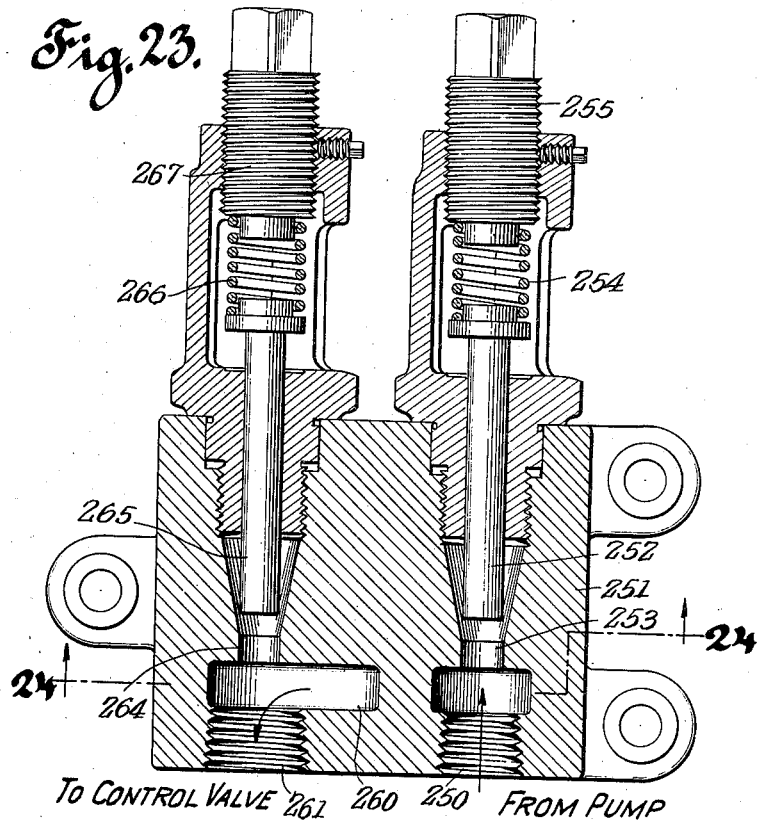
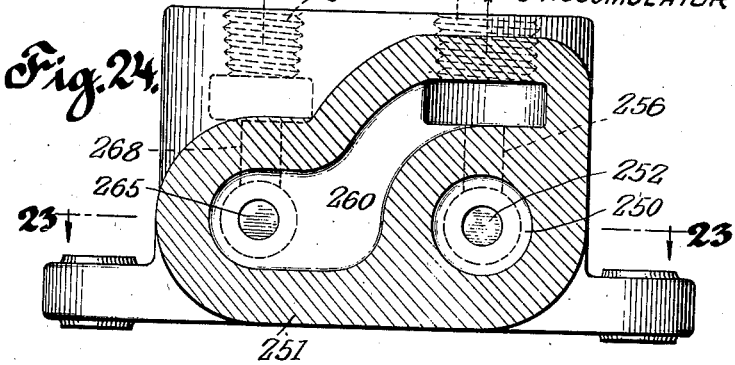

Patented Sept. 22, 1936

2,055,434

UNITED STATES PATENT OFFICE 2,055,434

METALWORKING MACHINE

George O. Gridley and Donald H. Montgomery, Berlin, and Earl Wheeler, Hartford, Conn., assignors, by mesne assignments, to The New Britain Machine Company, New Britain, Conn., a corporation of Connecticut Application September 21, 1929, Serial No. 394,232

96 Claims. (Cl. 29—38)

Our invention relates to a metal working machine and will be herein described as embodied in a multiple spindle chucking machine of the station type. It is, however, to be understood that various features of the invention are of broader application and may be embodied in machines of other types.

Generally speaking, it is our object to provide a machine of sturdy construction for rapidly turning out work of great accuracy, and a machine of relatively few and simple parts.

It is a more specific object of our invention to provide improved power or driving mechanism which may be a unitarily assembled device.

It is another object to provide an improved turret or carrier and mounting permitting easy operation combined with rigid supporting.

It is another object to provide an improved simple spindle drive permitting one spindle to automatically stop upon each indexing of a spindle carrier.

Another object is to provide improved tool carrier mechanism rigidly mounted and maintained in proper alignment with the work.

It is still another object to provide improved simple feed mechanism and controls.

A still further object is to provide a simplified fluid pressure chucking mechanism assuring proper chucking pressure at all times.

Other objects and various features of invention will be hereinafter indicated or will become apparent upon a reading of the specification taken in connection with the illustrative drawings.

In the drawings which show, for illustrative purposes only, one preferred embodiment of the invention—

Fig. 1 is a side elevation of a multiple spindle chucking machine illustrating features of the invention;

Fig. 2 is a right hand end elevation of the machine of Fig. 1;

Fig. 3 is a left hand end elevation of the machine of Fig. 1;

Fig. 4 is a vertical substantially central longitudinal sectional view on an enlarged scale of the left half of Fig. 1;

Fig. 5 is a view similar to Fig. 4 illustrating the right hand end of the machine and is substantially a continuation of Fig. 4;

Fig. 6 is a sectional view taken substantially in the plane of the line 6—6 of Fig. 4;

Fig. 7 is a sectional view taken substantially in the plane of the line 7—7 of Fig. 1;

Fig. 8 is a sectional view taken substantially in the plane of the line 8—8 of Fig. 7, the turret or spindle carrier being omitted;

Fig. 9 is an enlarged fragmentary view of the right hand turret lock of Fig. 7;

Fig. 10 is a view similar to Fig. 9 but illustrating the left end turret lock of Fig. 7;

Fig. 12 is a sectional view taken substantially in the plane of the line 12—12 of Fig. 13 illustrating a part of the power unit;

Fig. 13 is a sectional view taken substantially in the plane of the line 13—13 of Fig. 11;

Fig. 14 is an enlarged sectional view taken substantially in the plane of the line 14—14 of Fig. 11;

Fig. 17 is a sectional view taken substantially in the plane of the line 17—17 of Fig. 15;

Fig. 18 is a fragmentary sectional view taken substantially in the plane of the line 18—18 of Fig. 17 looking in the direction of the arrows;

Fig. 19 is a similar view taken substantially in the plane of the line 19—19 of Fig. 17 looking in the direction of the arrows;

Fig. 20 is an enlarged sectional view taken substantially in the plane of the line 20—20 of Fig. 17;

Fig. 23 is an enlarged sectional view of fluid pressure regulating valve mechanism of Fig. 21 and taken substantially in the plane of the line 23—23 of Fig. 24;

Fig. 24 is a sectional view taken substantially in the plane of the line 24—24 of Fig. 23.

General description

Figure 11:
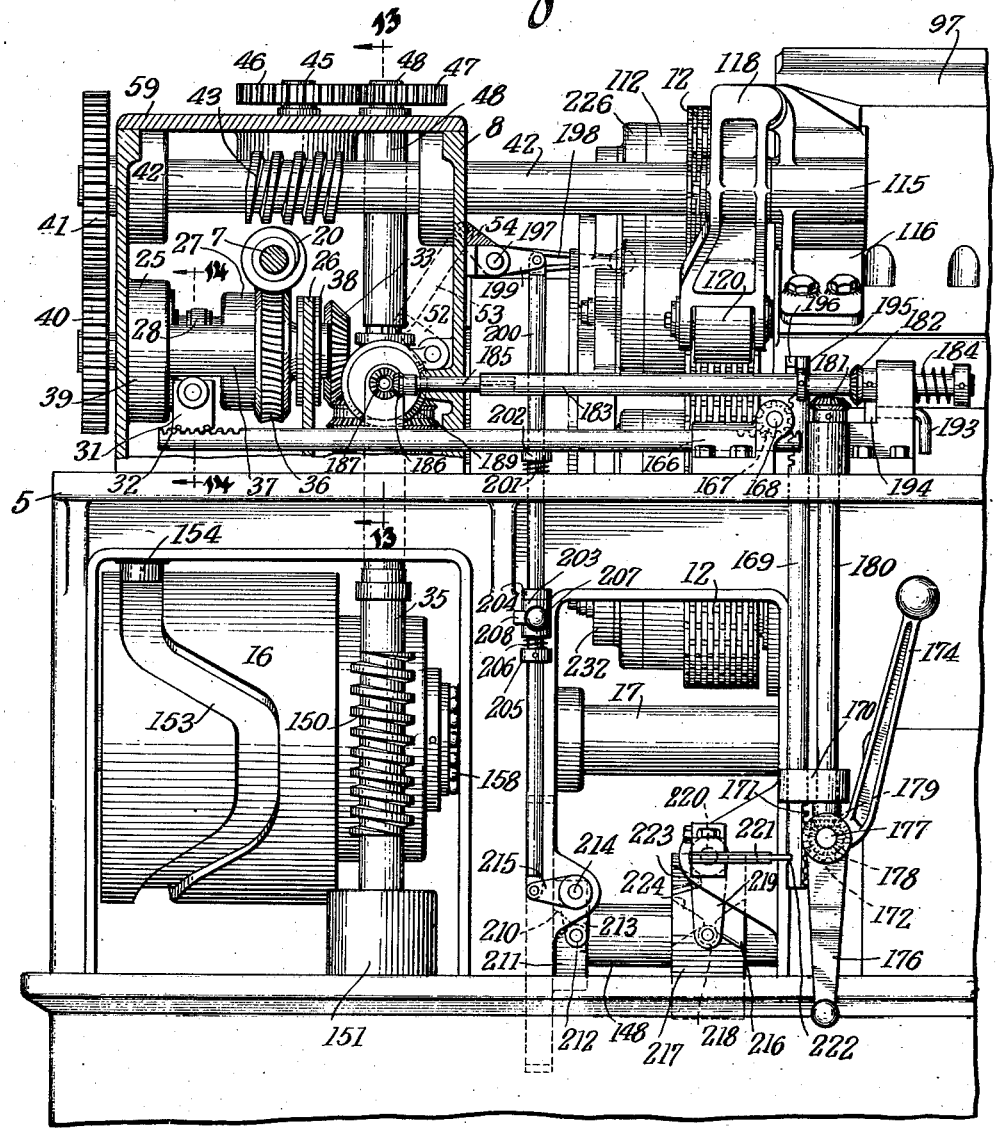
Fig. 11 is a view in side elevation of the left hand end of the machine shown in Fig. 1 with cover members removed and the power unit casing in section.

In the specific embodiment of the invention herein illustrated, 5 indicates the main frame of the machine which preferably carries all of the operative mechanism. The primary driving means is illustrated as a motor 6 mounted upon the frame 5 and having a shaft 7 extending into the power unit casing 8 also mounted upon the frame. Through suitable gearing mounted in and upon the casing 8, power is transmitted from the motor to the spindles and to the feed mechanism, indexing, locking and control mechanism.

The turret (in this case a spindle carrier 9) is mounted upon or forms a part of central stem means 10 (Figs. 4 and 5) supported in spaced bearings upon the frame. Spindles 11—11 are carried by the turret or spindle carrier and are revolved by a chain 12. The spindles preferably carry chucks while tools are carried by a tool carrier or slide 13 slidable upon one stem portion. Cross tool carriers (Figs. 2 and 5) are carried by substantially supported shafts and are actuated by cams. The tool slide 13 is fed by a draw rod 15 preferably extending centrally through the central stem portions 10 to the head end of the machine where it is actuated by the main cam 16 driven from the power unit.

The main cam shaft 17 carrying the main feed cam 16 is suitably geared to secondary or auxiliary cam shafts and all automatic control mechanism is primarily actuated from said main cam shaft 17.

The chucks carried by the spindles 11 may be actuated by pressure fluid, preferably oil, by means more specifically shown in Figs. 17 to 23, and all chucks holding work in operating positions are assured of a constant adequate supply of pressure fluid. Various features of the invention in the form herein illustrated will now be described in detail.

*Power unit*

The power unit heretofore referred to is shown more in detail in Figs. 11, 12, 13 and 14. The case 8, as stated, is mounted upon the main frame 5. The primary driving shaft, or specifically the motor shaft 7, extends into the casing for driving the speed and feed gearing and may continue through the opposite side of the casing 8 for directly driving the fluid pressure pump 18 mounted upon the outside of the case 8.

The shaft 7 within the case 8 is provided with worm means specifically shown as two worms 19—20. The worm 19 drives the fast traverse while the worm 20 is the initial drive for the slow traverse and the spindles. The worm 19 meshes with and drives a worm wheel 21 freely mounted as by means of an antifriction bearing 22 upon a shaft 23. The shaft 23 is adequately supported by spaced bearings 24—25 carried respectively by an upstanding web 26 and the side of the casing 8. The shaft 23 carries a clutch member 27 splined thereto and having engaging means such as teeth to coact with complementary clutch means of the worm wheel 21, as will be clear from Fig. 12. The clutch member 27 is actuated by a yoke 28 carried by an arm 29 which itself is carried by a shaft 30 actuated by a segment 31 and rack 32, as will be described more in detail in connection with the feed and control mechanism. The shaft 23 carries a bevel gear 33 meshing with a bevel gear 34, which gear 34 is non-rotatably secured to the main feed cam shaft 35.

When the clutch member 27 is thrown in, the worm wheel 21 drives the shaft 23, and through the meshing bevel gears 33—34, the main feed cam shaft 35 is driven at the appropriate speed to be determined by the various functional characteristics of the machine. Ordinarily, this speed will be the fastest speed imparted to the feed drive cam shaft 35 and is the fast traverse which is employed for retracting the tools, indexing the turret or spindle carrier, and jumping the tools back to operative position. When the clutch member 27 is thrown out, the worm wheel 21 merely idles upon the shaft 23, and if the shaft 35 is being driven by the slow traverse, to be hereinafter described, the gear 33 is merely driven idly by the gear 34.

In the specific embodiment herein shown, the worm 20 is the primary drive for the spindles and the slow traverse. As illustrated, the worm 20 drives a worm wheel 36 carried by a shaft 37 mounted in a bearing 38 in the upstanding web 26 and in an opposite bearing 39 in the casing 8. The shaft 37 extends through the casing 8 and at the outer end carries a gear 40 on the outside of the casing. A second gear 41 meshes with the gear 40 and is carried by a shaft 42 extending into and through the casing 8. The shaft 42 is the spindle drive shaft and at the end opposite the gear 41 is connected to the spindle driving means (in this case the chain sprocket), as will be later described. The gears 40—41 are pick off gears so that by substituting other gears the speed of the spindle drive shaft 42 may be varied so as to give the desired spindle speeds.

In the form illustrated, the spindle drive shaft 42 is in the train of gearing constituting the slow traverse. The spindle drive shaft 42 carries a worm 43 which meshes with a worm wheel 44 carried upon a stub shaft 45 extending to the outside of the casing 8. A pick off gear 46 is mounted upon and driven by the shaft 45. A second pick off gear 47 meshes with the gear 46 and is mounted upon a shaft 48 extending downwardly into the casing for ultimately driving the shaft 35 at the slow traverse speed. The shaft 48 drives the main feed shaft 35 through an overrunning clutch or ratchet mechanism, as will be described, so that when the fast and slow traverse are both in, the fast traverse will be able to drive, and the overrunning clutch will merely ratchet.

In the form illustrated, the shaft 48 has a clutch member 49 splined thereto. The clutch member 49 is actuated by a yoke 50 on a shaft 51, which shaft also carries an arm 52 at the outside of the casing 8 and may be actuated through a link 53 and arm 54 as will be later described in connection with the feed and control mechanism. The clutch member 49 is designed to coact with a complementary clutch member 55 carried upon a hub 56 which at the lower end carries one member 57 of an overrunning clutch. This overrunning clutch may be of any desirable form and as illustrated the member 57 may be a scalloped plate carrying balls or rollers 58—58 which seat in suitable recesses formed in the lower hub portion of the bevel gear member 34. Thus, when the clutch members 49—55 are in engagement and the fast traverse clutch is thrown out, the ratchet member 57 will drive the main drive shaft 35 through the clutching or ratchet elements 58. It will be seen that by reason of the two pairs of pick off gears 40—41 and 46—47, the spindle speeds may be varied and the slow traverse speed likewise varied so as to give the desired speed and slow traverse feed.

The gearing within the housing 8 preferably operates in grease or oil and all interior parts are accessible when the cover member 59 is removed. The gears 40—41 are preferably enclosed by a removable cover 60 (Fig. 3), and the gears 46—47 are preferably likewise housed under a removable cover 61. By mounting the oil pump 18 directly upon the motor shaft, a supply of pressure fluid is always provided when the motor is operating, and the supply is independent of changes of speed of the gearing.

Turret and operation

The turret (see Figs. 4 to 10) (in this case a spindle carrier 9) is mounted upon the frame so as to be indexed with great ease and yet held in indexed position with great accuracy and rigidity. The carrier such as the turret 9 has projecting stem portions, either or both of which may or may not be integral portions of the turret. In the illustrated form, the turret 9 is a separate member mounted upon the separate central shaft or stem member 10. The rear end of the carrier 9 abuts a shoulder 62 in the stem (Figs. 4 and 17), to prevent endwise movement of the spindle carrier thereon. The stem portions 10 projecting from the spindle carrier (whether formed integrally therewith or as a separate member or members) will preferably be of heavy construction and supported at one end in a substantial frame bearing 63 carrying antifriction bearings 64—65. The two antifriction bearings are preferably initially loaded and the bearing 65 resists end thrusts toward the left set up by the tools during operation. The stem portion projecting at the right hand end (Fig. 5) is mounted in a substantial frame bearing 66 embodying antifriction bearings 67—68. These bearings, if desired, may be floating so as to provide for the limited longitudinal expansion and contraction of the stem means without affecting the bearings 64—65 and yet afford the right hand stem portion the substantial support which is desired.

During indexing movements of the spindle carrier and stem 10, the latter preferably is the sole bearing support for the spindle carrier; that is to say, the spindle carrier is out of bearing contact with the main frame. This construction permits an almost frictionless indexing, and indexing may be at a rapid rate. Between indexing movements, the turret is rigidly supported from the frame so as to definitely hold the turret against movement in any direction and permit work of great accuracy to be turned out.

The indexing of the turret may be performed by any suitable mechanism, but preferably we employ a Geneva type of index which may include slotted members 69—69 (Figs. 4 and 6) to be engaged by a roller 70 carried upon the Geneva arm 71 fixed to the main cam shaft 17 so as to be rotatable therewith. Thus, as will be readily understood, when the cam shaft 17 carrying the arm 71 is rotated, the roller 70 will engage the slotted members 69 and index the turret step by step in a well known manner.

As has been heretofore stated, during indexing movement of the turret the latter is preferably supported solely by the stem 10 and the end bearings. At each work station, however, the carrier is preferably solidly engaged with a part of the frame so as to rigidly support the carrier and prevent movement or vibration. In the form shown (Figs. 7 to 10), the forward web 72 of the turret or spindle carrier is provided with one circumferential series of locking grooves or notches 73 equal in number to the number of indexed positions of the carrier. These locking grooves or notches are preferably formed in hardened steel blocks 74 set into the turret web 72 and are provided at one side with a radially extending surface 75 and at the opposite side with an inclined surface 76 serving as a cam surface. In line with the series of notches 73 is a locking arm 77 pivotally mounted upon a shaft or pin 78 carried by the main frame 5. This locking arm is provided with a surface 79 to fit flat against the radial surface 75 when the arm is in the "in" position shown in Figs. 7 and 10. A moderately heavy plate spring 80 serves to constantly urge the locking arm 77 in the locking direction. With the locking arm in the "in" position and the two surfaces 75—79 both extending radially of the turret, there is no tendency for the arm 77 to be cammed out so long as these surfaces are in contact and the turret will be rigidly held against rotative movement in one direction. When the turret is moved in the indexing direction, that is, counterclockwise, as viewed in Fig. 7, the cam surface 76 engages the corresponding cam surface 81 opposite the surface 79, and the locking arm is cammed out and overcomes the tendency of the spring 80 to hold the same inwardly. Between indexed positions, the nose of the arm 77 rides upon the outside of the web 72 until the next notch 73 arrives in position when the arm is again forced in by the spring 80 and locks the carrier against rotation in one direction.

The web 72 may also be provided with a second set of locking grooves or notches 82 preferably in longitudinal alignment with, but spaced from, the series of notches 73. The locking grooves 82 are also preferably formed in hardened steel blocks 83 set into the circumference of the web 72. Each notch 82 is provided with a cam locking surface 84 to be engaged by a cam locking surface 85 on a locking arm 86 pivotally mounted on a shaft or pin 87 carried by the frame at the side opposite the arm 77. A very heavy plate spring 88 engages the arm 86 and urges the same inwardly into the locking notches 82 successively. Due to the strength of the heavy spring 88, it is not usually practicable to have the arm 86 cammed out of the notches 82 by the indexing movement of the turret and we preferably provide mechanical means for moving the arm 86 out of locking engagement with the turret. In the form shown, the lower free end 89 of the arm 86 is positioned to be engaged by the end 90 of a lever 91 mounted for oscillation upon a shaft or pin 92 in the frame. The free end of the lever 91 may carry a roller 93 to be engaged by a cam 94 upon the main cam shaft 17. Thus, when the cam shaft 17 is rotated, the lever 91 is rocked to remove the nose of the arm 86 from the notch 82, and the arm 86 is held in the "out" position by the dwell of the cam 94 while the turret is being indexed. As soon as the turret has reached its indexed position, the arm 77 is forced in as heretofore described, and the roller 93 on the lever 91 leaves the cam 94, and the heavy spring 88 forces the nose of the lever 86 into the notch 82. The cam surfaces 84—85 contacting with each other tend to force the turret downwardly and cause the arm 77 to lock more tightly. This tendency of the arm 86 to cam or force the turret downwardly is taken advantage of by us for providing a rigid support for the turret between indexing movements.

We preferably provide adjustable means to be engaged by the turret only when the turret has been indexed and the locking arms 77—86 move the turret downwardly a slight permissible distance. In the form shown, we provide one or more adjustable supports 95—95 (Fig. 7) beneath the turret. These supports 95—95 may be in the form of pins beveled off so as to substantially fit the circumference of the web 72. These supports or pins may be moved inwardly for adjustment by means such as screws 96—96 in the frame. By means of the screws very nice adjustments may be made, and the supports 95—95 positioned so as to be just out of bearing contact with the turret during indexing movements. When the turret is indexed and the locking arms 77—86 are in engagement with the turret, the very slight give in the stem means 10 will permit the turret to be moved into tight supporting engagement with the supports 95—95. It is to be understood that this movement transversely of the stem axis is exceedingly slight, but even the slightest spacing of the spindle carrier from the supports 95—95 will permit indexing with the greatest ease, and yet when the turret is drawn down into supporting bearing engagement with the supports 95—95, the turret will be held with great rigidity and the frictional holding forces of the supports just mentioned will relieve the thrust bearing 65 of the central stem 10 of some of the thrust load created by the tool pressures during operation.

In order to prevent chips and the like from passing between the hood portion 97 of the frame 5 and the spindle carrier 9, we may provide a felt or other dust ring 98 (Figs. 5 and 17) seated in a counterbore 99 (Fig. 8) and held therein by means of retaining rings 100 secured to the face of the hood portion 97 as by means of screws 101—101. The felt ring 98 constantly bearing upon the spindle carrier will prevent chips from working between the turret and the hood portion of the frame.

Spindles and drive

As shown more particularly in Figs. 4, 5, 15 and 17, the spindle carrier or turret carries a number of chucking devices, in this case in the form of rotary spindles provided with chucks at the front end and driving means at the rear end. In the form illustrated, each spindle 11 is mounted in antifriction bearings 102—102 of ample proportions in the front web 72 of the turret. Rear bearings 103—103, which may be smaller than the forward bearings, support the rear end of each spindle in the rear web 104 of the turret. In the bearings 102—102, which are initially loaded, the outer rings are fixedly held in a counterbore in the web 72 by means of an annular ring 105 secured as by means of screws 106 to the turret web 72. The inner rings are held between a shoulder 107 on the spindle and a nut 108 threaded thereon. The rear supporting bearings 103 may be floating. Each ring 105 may carry a sealing ring 109 of felt or the like bearing on the forward end of the spindle 11. Each spindle carries a chuck 110 of desired form.

The spindles are driven, in the form shown by means of a chain and the driving system is of novel form. The rear end of each spindle 11 is provided with a sprocket 111 secured thereto. In the form of machine illustrated wherein hydraulic chucking devices are employed, a fluid pressure cylinder 112 may be directly keyed to the spindle at 113 and the sprocket 111 keyed to the projecting sleeve of the cylinder 112 as indicated at 114. Whatever the specific construction employed, the sprockets are suitably held to the spindles 11 so as to drive the same. As heretofore described, the spindle drive shaft 42 (Fig. 11) is driven at the selected predetermined speed. The shaft 42 (Figs. 11, 15 and 16) is supported at the forward end in a bearing 115 in a bracket 116, which may be secured to a main frame or the housing portion 97 thereof. Between the bearing 115 and the power unit, the spindle drive shaft 42 carries a driving sprocket 117 over which the driving chain 12 is trained.

Figure 15:
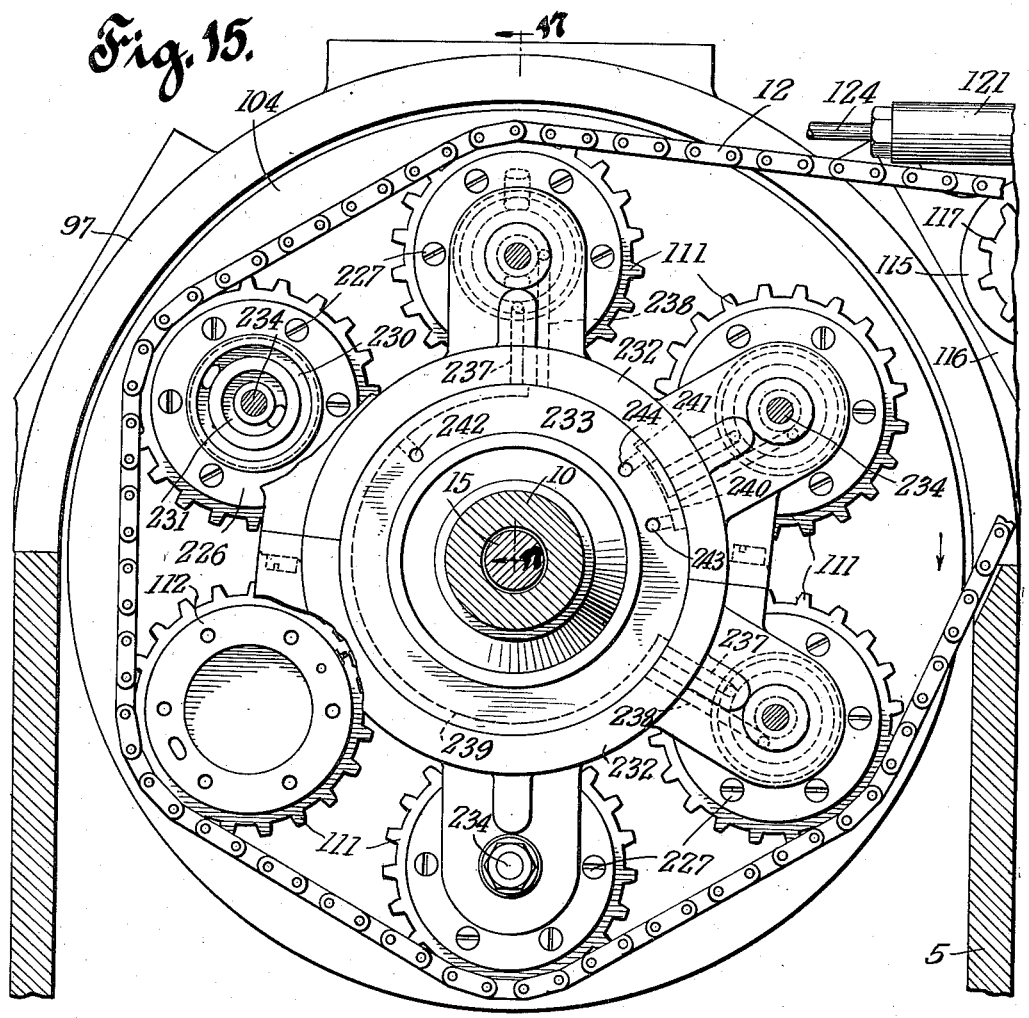
Fig. 15 is a sectional view taken substantially in the plane of the line 15—15 of Fig. 4.
Figure 16:
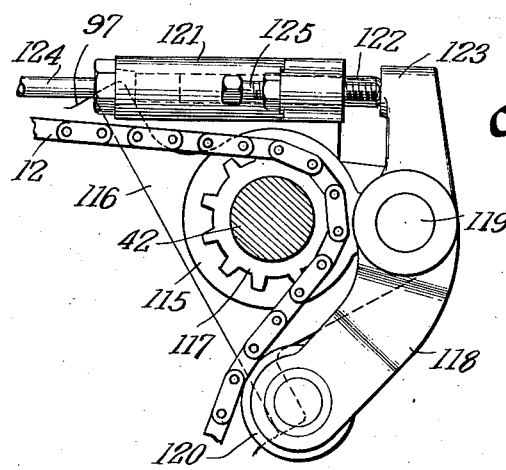
Fig. 16 is an enlarged detail of fluid pressure chain tightening mechanism.
Figure 21:
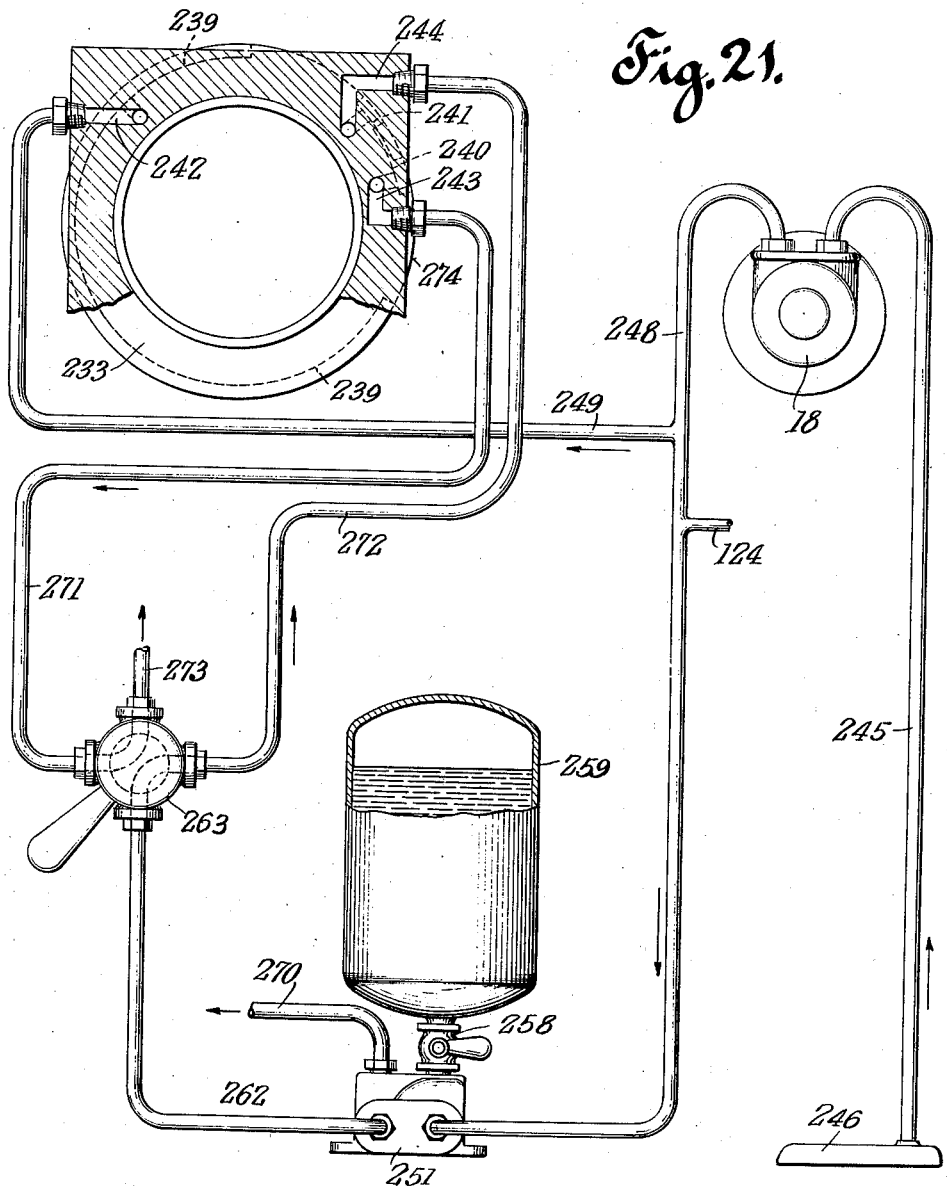
Fig. 21 is a sectional view taken substantially in the plane of the line 21—21 of Fig. 17, parts being omitted and the fluid pressure mechanism being shown somewhat diagrammatically.

As will be clear particularly from Figs. 3, 15 and 16, the driving sprocket 117 is arranged outside of the circumferential path of the spindles for a purpose to be described. The chain 12 is trained over the spindle sprockets 111—111 and is in constant driving contact with all of said spindle sprockets except one which is in the loading position. The mounting of the driving sprocket 117 outside of the circumferential path of the spindle sprockets permits one spindle sprocket to leave driving contact with the chain during each indexing movement and causes the spindle sprocket which was in the loading position and therefore out of driving contact with the chain, to again be moved into driving contact with the chain upon each indexing movement of the spindle carrier. By means of the arrangement shown, one spindle is always automatically uncoupled from the driving chain upon each indexing movement of the spindle carrier, and this uncoupling is permitted without the use of clutches and attendant operating mechanism.

In order to take up slack in the chain 12 when one spindle sprocket is leaving contact with the chain and when another sprocket is moved into engaging contact with the chain, we prefer to provide a chain tightener. In the form shown, the bracket 116 carries a lever 118 pivotally mounted thereon at 119. One end of the lever carries a roller 120 for engagement with the chain, while the other end of the lever is moved by suitable means to urge the roller into contact with the chain and keep the latter taut. In the form shown, we employ a fluid pressure cylinder 121 carried by the bracket 116, which cylinder carries a plunger 122 for engaging the end 123 of the lever 118. The cylinder 121 is in constant communication with a source of pressure fluid through the pipe 124. If desired, a set screw or the like 125 may be employed for limiting the inward movement of the end 123 of the lever 118. The chain drive and adjacent parts are preferably enclosed beneath a suitable hood, as shown more particularly in Figs. 1, 2 and 3, so as to exclude foreign matter and prevent splashing of lubricant.

Tool carriers

As heretofore described, the work carrier is supported and held with great rigidity, and the tool carriers to be described are likewise rigidly supported so as to permit the turning out of work of a high degree of accuracy. In the form shown (Figs. 1, 2 and 5), the main tool carrier is in the form of a slide 13 accurately fitting and slidable upon the supporting stem 10. The slide 13 may have a plurality of flat sides provided with slots 127 for securing tool holders to the slide. The slide may be reciprocated by means of the actuating or draw rod 15 as will be described.

In the form shown, the rear end of the slide 13 is provided with a seat to be received within a ring or bearing portion 128 on a rear enclosing hood 129 extending outside of and over the bearings 67—68 of the stem 10 and serving to protect such bearing, as well as the adjacent parts of the supporting stem 10, from chips and dirt. The hood 129 may be dowelled or otherwise rigidly secured to the tool slide as indicated at 130—130. The lower side of the hood 129 is open so as to straddle the upstanding portion 131 of that part of the frame carrying the bearing housing 66. The upstanding frame portion 131 preferably carries hardened steel bearing blocks 132—132 at opposite sides, which blocks are engaged by finished bearing surfaces 133—133 on the downwardly extending skirt portions of the hood 129. Thus, when the slide 13 is reciprocated, it is accurately guided in a longitudinal direction by the hardened steel wear blocks 132—132 and the coacting slide surfaces 133 on the hood. This construction provides a very rigid support for the slide against any rotative movement.

The rear end of the hood 129 at the outside of the frame is closed by a substantial end cap 134 secured thereto as by means of screws 135—135. The actuating or draw rod 15 passing centrally through the bore in the supporting stem 10 is secured to the cap 134 as by means of a cross pin 136. Thus, when the draw rod 15 is reciprocated by the main cam 16 as will be later described, the tool slide 13 is reciprocated longitudinally and during such reciprocating is solidly supported against any rotative movement and is accurately guided longitudinally by the stem 10. The forward end of the slide 13 may carry a dust ring 137 of felt or the like for excluding chips and other foreign matter from the wear surfaces between the stem 10 and slide 13. At the rear end of the slide 13 such a dust ring may be omitted since that end of the slide is adequately protected by the hood 129. An inner portion of the slide 13 may be chambered as shown at 138 (Fig. 5) so as to hold a supply of lubricant entering through a radial hole 139 in the stem 10.

We may employ tool carriers in addition to the tool slide 13. In the form shown, only two additional tool carriers or forming tool supports are shown, which, in the particular form illustrated, are oscillating carriers 140—141 (Figs. 2 and 5) mounted upon substantial shafts 142—143 supported in bearings 144—145 in the frame 5. These substantial shafts 142—143 provide a very rigid support for the oscillating tool carriers so as to prevent chatter. The oscillating tool carriers are actuated by cams 146—147 carried by the auxiliary cam shafts 148—149 respectively (Figs. 2, 4 and 6), which shafts are journaled in the frame, as will be understood. Clearly, any practicable number of oscillating or cross slide tool carriers may be employed, as will be understood by those skilled in the art.

*Feed mechanism and controls*

As heretofore explained, power is transmitted through the power unit (Figs. 11 to 13) either by the fast or slow traverse gearing to the shaft 35 which drives the main cam shaft 17. All of the feed mechanism, as well as unlocking and locking of the spindle carrier, indexing, etc., are timed by the main cam shaft 17. In the form shown, the main feed shaft 35 is provided with a worm 150 and is mounted at the bottom in a bearing 151 carried by the frame 5. The worm 150 meshes with a worm wheel 152, Fig. 4, mounted so as to rotate the main cam shaft 17 and the cam drum 16. The drum 16 is provided with cam means such as the cam groove 153 which receives a cam follower 154 carried by a follower slide 155 slidable in ways such as 156 on the main frame. The feed slide draw rod 15 is secured to the slide 155 as by means of a pin 157 so that upon actuation of the slide by the cam 153, the draw rod 15 will be actuated so as to reciprocate the main tool side 13. The thrust of the cam drum 16 may be taken by a thrust bearing 158 mounted between the web 159 and a part of the cam drum or other part carried by the cam shaft 17. The main cam shaft 17 as heretofore described carries the indexing arm 71 for indexing the turret or spindle carrier and also carries the cam 94 for withdrawing the locking arm 86 as heretofore described.

The main cam shaft 17 in the form shown is geared to and drives the auxiliary cam shafts 148—149 (Fig. 6) mounted in suitable bearings in the web 159 and the web 160 (Fig. 4) on the frame. The shaft 17 carries a spur gear 161 which meshes with a spur gear 162 on the auxiliary cam shaft 148 and with a spur gear 163 carried by the auxiliary cam shaft 149. The gears 161, 162 and 163 are preferably of the same size so that for each revolution of the main cam shaft 17 there will be one revolution of each of the auxiliary cam shafts 148—149. The auxiliary cam shaft 149 as heretofore noted carries a cam 147 for engagement with the roller 164 on the arm for swinging the rear oscillating tool carrier 141. The auxiliary cam shaft 148 as heretofore noted carries the cam 146 for engaging the roller 165 for similarly actuating the front oscillating tool carrier 140. The cams heretofore referred to are so timed that when the tool slide 13 is in operating position and when the oscillating slides are in active position the turret is locked. When the tool carriers are withdrawn to inactive position, the cam 94 unlocks the turret, and the indexing arm 71 indexes the same. The shafts 148, 149 are preferably in a horizontal plane below the shaft 17. The shafts 148, 149 are thus positioned adjacent the front and back sides of the frame where they are readily accessible for cam changing. The cams are preferably longitudinally rearwardly of the generally upstanding transverse frame wall forming a bearing for the front of the spindle carrier (Fig. 5).

In addition to the actuation of the tool carriers, unlocking of the turret, indexing, etc., controlled by the cam shafts, we provide additional cams for controlling the fast and slow traverse and for stopping the machine when desired at the end of each cycle. In the form shown, such additional cams are carried by drums on the front auxiliary cam shaft 148, as will be described. The rack bar 32 (Figs. 11 to 14) as has been noted is employed for actuating the fast traverse clutch member 27 for throwing the fast traverse in and out. This rack bar 32 may be actuated manually and automatically. As herein illustrated, the rack bar 32 extends through the power unit casing 8 and is guided in a bearing bracket 166 on the frame (Fig. 11). The end of the rack bar 32 adjacent the bracket 166 is provided with rack teeth for engagment with a pinion 167 rotatably mounted in the bracket 166 at 168. A vertical rack bar 169 is slidably mounted in the frame 5 and a lower bracket 170 on the frame. On its upper end, the rack bar 169 is provided with rack teeth for engagement with the teeth on the pinion 167 as will be clear from Fig. 11. The rack bar 169 is provided at its lower end with rack teeth 171 for engagement with and actuation by a pinion 172 on a hollow shaft 173 (Figs. 2 and 3) mounted for oscillation on the frame. A manual actuating handle 174 is connected to the hollow shaft 173 so that upon swinging of the handle 174 the pinion 172 will move the rack bar 169 and through the pinion 167 the horizontal rack bar 32 will be moved so as to throw the fast traverse clutch part 27 in or out. In the preferred form, the hollow shaft 173 carrying the pinion 172 extends through the frame 5 and is provided at the rear side thereof with an actuating handle 175 (Figs. 2 and 3) similar to the handle 174 at the front. Thus, an operator at either the front or the back side of the machine may actuate the fast traverse clutch manually.

We provide means for hand-cranking of the machine for setting up, etc., and provide locking mechanism whereby when the hand-cranking mechanism is thrown in, the fast traverse is locked out so as to avoid injury to the operator. In the form shown (Figs. 1, 2, 3 and 11), a hand-crank 176 is carried by a shaft 177 which may pass through the tubular shaft 173 carrying the handles 174—175. The shaft 177 carries a bevel pinion 178 meshing with a bevel pinion 179 on a vertical shaft 180. At the upper end, the shaft 180 carries a bevel pinion 181 to be engaged at times by a bevel pinion 182 on a sleeve shaft 183 slidable in the frame. The shaft 183 may be spring pressed rearwardly as by means of a spring 184 interposed between a collar on the end of the shaft and a bracket carried by the frame, as will be clear from Fig. 11. Splined to the sleeve shaft 183 is a shaft 185 passing into the power unit casing 8 and carrying a bevel pinion 186 meshing with a bevel pinion 187 on a shaft 188 within the casing 8 (Fig. 13). The end of the shaft 188 carries a bevel gear 189 meshing with a bevel gear 190, which may be formed integrally with the hub 191 which carries the fast traverse bevel gear 34. Thus, the main cam drive shaft 35 may be hand operated by the crank 176 or the duplicate hand-crank 192 carried by the other end of the shaft 177 extending through the frame.

When the machine is to be hand-cranked, the fast traverse clutch is thrown out and the sleeve shaft 183 is moved toward the left as viewed in Fig. 11 to engage the bevel gears 181—182. The short handle 193 is then turned so as to bring the latch 194 carried thereby into position behind the collar of the bevel gear 182 so as to hold the gears 181—182 in engagement with each other. Then, upon rotation of either of the cranks 176—192, the shaft 180 will be rotated through the bevel gears 178—179 and the shafts 183—185 will be rotated through the bevel gears 181—182 and the shaft 188 will be rotated by the bevel gears 186—187. The bevel gear 189 on the shaft 188 will then rotate the main cam driving shaft 35 through the bevel gear 190, as explained. In order to prevent the fast traverse clutch from being thrown in when the hand-cranking gears 181—182 are in engagement with each other, I may provide a detent 195 on the shaft 183, which detent will be in position beneath the abutment 196 carried by the vertical rack rod 169 so that the latter cannot be moved downwardly by the handle 174 or 175 to throw in the fast traverse clutch. It is only when the gears 181—182 are out of driving engagement with each other that the fast traverse handles 174—175 can be moved to throw in the fast traverse clutch part 27.

The slow traverse clutch 49 (Figs. 11 to 13) may be manually actuated through the yoke 50, shaft 51, arm 52 on the outside of the casing 8, and arm 54 carried by the shaft 197 extending across the frame and journaled in a bracket on the casing 8. The shaft 197 carries a manual actuating handle 198 at the rear side of the machine and carries an actuating lever arm 199 at the forward side of the machine. Thus, by moving the handle 198 at the rear of the machine, the slow traverse clutch member 49 may be thrown in or out. At the front of the machine, we preferably provide a slightly different arrangement for manually throwing the slow traverse clutch. In the form illustrated, the actuating arm 199 is pivoted to a vertical bar 200 slidable in bearings on the frame. A spring 201 positioned beneath a collar 202 on the vertical bar 200 urges the bar 200 upwardly and the clutch 49 to the clutched in position. The bar 200 carries a collar 203 rotatably mounted on the bar 200 and interposed between collars 204—205 on the bar 200. A spring 206 normally tends to hold the collar 203 in the elevated position on the bar shown in Fig. 11. The collar 203 has a handle or hand grip 207 which may be manually actuated for throwing the slow traverse clutch 49 in or out, as will be clear. The spring 201, as heretofore stated, normally tends to hold the slow traverse clutch 49 in the clutched in position. When it is desired to hold the clutch 49 in unclutched position, the handle 207 is depressed so as to throw the slow traverse clutch 49 out, and then by means of the handle 207 the collar 203 carrying a detent finger 208 (Fig. 3) is rotated so as to move the latter beneath an abutment 209 carried by the frame. The detent and abutment will then hold the slow traverse clutch in unclutched position.

In addition to the manual means described for throwing the fast and slow traverse clutches, we provide means for automatically throwing the fast traverse clutch at times and preferably for throwing the slow traverse clutch when the machine is arranged for hand loading and the machine stopped at the end of each cycle. For magazine feeding the machine would not ordinarily be stopped at the end of each cycle, but would continue in operation until manually stopped.

In the form shown, the traverse clutches 27—49 are automatically actuated by cam means on the auxiliary cam shaft 148. If we assume the main feed cam 16 to be in the position shown in Figs. 4 and 11, the main tool slide 13 will be at substantially the inner limit of its travel, and we shall assume that during the feed movement the cam 16 has been actuated by the slow traverse. Assuming that the cross tools have finished their operations, it is desirable to throw in the fast traverse for retracting the tools and indexing the turret. It may be desirable, though not necessary, to throw out the slow traverse when the fast traverse is "in". In order to automatically throw out the slow traverse, we may provide a cam such as 210 carried by a small cam drum 211 on the auxiliary cam shaft 148. The cam 210 is properly positioned circumferentially so that at the proper time it engages the roller 212 carried by the arm 213 on a shaft 214 journaled in the frame. The shaft 214 carries an arm 215 pivotally connected to the lower end of the vertical bar 200. When the cam 210 engages the roller 212, the bar 200 is moved downwardly against the spring 201 and the slow traverse clutch is thrown out. As soon as the cam 210 has passed from behind the roller 212, the spring 201 again throws in the slow traverse clutch. In the machine as herein illustrated, the single cam 210 is positioned to throw out the slow traverse clutch only at the end of each cycle.

The fast traverse clutch part 27 (Fig. 12) is thrown in by a cam 216 (Fig. 11) carried upon a drum 217 on the auxiliary cam shaft 148. The cam 216 is adapted to engage a roller 218 on an arm 219 carried by a shaft 220 journaled in the frame. In the form shown, a plate spring 221 is connected so as to move with the shaft 220 upon oscillation thereof by the cam 216 or other cams. The spring 221 is operatively connected to the rack bar 169 as by means of a notch 222 in the bar 169 into which the end of the spring 221 extends. Thus, when the cam 216 engages the roller 218, the shaft 220 is oscillated in its bearings and the spring 221, which is of sufficient stiffness, moves the rack bar 169 downwardly so as to throw in the fast traverse clutch 27 the same as if the bar 169 had been moved downwardly by either of the manual handles 174 or 175 as heretofore described. If while the roller 218 is in engagement with the cam 216 it is desired to throw out the fast traverse clutch manually, the spring connection 221 will permit this to be done. It will be clear that with the spring 221 properly proportioned, such spring will be strong enough to throw in the fast traverse clutch by means of the cam 216, but the spring may be flexed sufficiently to throw the fast traverse clutch out manually by means of the handle 174 or 175. When the tools have been retracted and the turret indexed, the fast traverse clutch 27 is thrown out. For the purpose of throwing the fast traverse clutch out, we provide a cam 223 to engage the roller 218 so that the shaft 220 will be rocked and through the spring 221 the fast traverse clutch will be thrown out. The slow traverse clutch 49, if not previously thrown out by the cam 210, is thrown out at the time the fast traverse clutch is thrown out by the cam 223. The feed mechanism will then be stopped and the chuck in the loading position is loaded. The operator then manually moves the handle 174 or 175 to throw in the fast traverse clutch 27, this throwing in being permitted by the spring 221 even though the roller 218 is still in engagement with the cam 223. With the fast traverse clutch in, the tools will be jumped to operative position, and then another cam 224 similar to the cam 223 will engage the roller 218 for throwing out the fast traverse clutch and previously the slow traverse throw out cam 210 will have released the cam roller 212 and the slow traverse clutch 49 will have been thrown in so that the cam drum 16 will be driven through the slow traverse gearing for feeding the tools.

*Fluid pressure chucking system*

The chucking devices may be actuated by fluid pressure means. In the form shown, the jaws of each chuck 110 (Fig. 17) are actuated by a draw rod 225 which moves the chuck jaws in any well known or desired manner. As illustrated, the jaws are closed upon a movement of the draw rod 225 toward the left as viewed in Fig. 17. Each spindle carries a cylinder 112, the hub portion of which is keyed at 113 to the spindle as previously described. Each cylinder has a cylinder head 226 secured thereto as by means of screws 227 (Fig. 15). A fluid passage 228 leads to the tail end of the cylinder, while the passage 229 leads to the head end whereby pressure fluid may pass to and exhaust from either end of the cylinder at appropriate times, as will be described. The tail end passage 228 is in constant open communication with an annular passage 230 (Fig. 19) in the cylinder head 226, and the head end passage 229 is in constant communication with a second annular passage 231 in the cylinder head.

Figure 22:
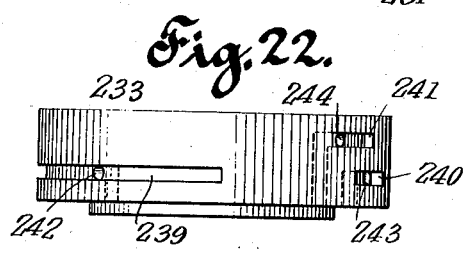
Fig. 22 is a view in elevation of a distributor block shown in Figs. 4, 17 and 21.

Each cylinder head is rotatably connected to a ring member 232 which has a running fit with what may be termed a distributor block 233 (Fig. 22). The ring member 232 may be connected to each cylinder head by means of a bolt 234 secured to the cylinder head and passing through an aperture 235 in the ring. An antifriction bearing 236 may be employed for permitting free rotation of the bolt 234 and cylinder head 226 while still maintaining a relatively close running fit between the ring 232 and each cylinder head. The ring 232 adjacent each cylinder has a passage 237 in constant communication with the tail end passages 228—230 in the cylinder. The ring 232 is also provided with a second passage 238 in constant communication with the head end passage 229—231 of each cylinder.

The distributor block 233 has an outwardly opening circumferential fluid passage or groove 239 extending, in the form shown, about two-thirds of the way around the circumference. This passage 239 is in line with the passage 238 in the ring 233. The distributor block 233 has a second passage 240 in line with but entirely separate from the passage 239. The distributor block 233 has another passage 241 extending circumferentially but out of line with the passages 239—240. In the form illustrated, the distributor block 233 is non-rotatably secured to a part of the frame such as that part 63 carrying the bearings 64—65 for the stem 10. A passage 242 (Fig. 21) leads from a source of pressure fluid into the extended passage 239. A second passage 243 leads to the passage 240 in the distributor block, while a third passage 244 leads to the passage 241 of the distributor block. The passage 242, and consequently the extended passage 239 of the distributor ring, is designed to be in constant communication with a source of high pressure fluid so as to maintain all of the chucks, except the one in loading position, in closed position, as will be described. The passages 243—244, and consequently the passages 240—241, are designed to be alternately connected with exhaust and with a source of pressure fluid for reciprocating each piston for opening and closing the chucks in loading position as will later appear. The passage 237 in the ring 232 is in such positon as to communicate with the extended passage 239 or the passage 240, depending upon the circumferential indexed position of the ring 232, while the passage 238 is designed to communicate only with the passage 241 for a purpose to be described.

While the passages in the cylinder head ring 232 and distributor block 233 may receive pressure fluid from any suitable source, we prefer to employ oil as the pressure fluid and have devised a particularly advantageous and novel supply system which will now be described. The pump 18 of any desirable type is driven as by means of a direct connection with the motor shaft as heretofore described. The intake 245 (Fig. 21) receives fluid through a strainer 246 in the sump in a suitable chamber 247 (Figs. 4 and 5) in the frame of the machine. The discharge pipe 248 from the pump 18 delivers fluid through the pipe 249 directly to the passage 242 and consequently to the extended interior fluid passage 239 in the distributor ring 233. A branch line 124 delivers pressure fluid directly to the belt tightener device shown in Fig. 16 when such device is employed. It will thus be seen that the direct pump pressure is always delivered and maintained in the passage 239, which, as heretofore stated, communicates through the passage 237 and passages 228—230 with the tail end of the cylinders for maintaining all of the chucks, except the one in loading position, closed. We provide an improved system including a storage reservoir for pressure fluid so that the piston in cylinder 112 in loading position is actuated by pressure fluid stored up by the pump so that the direct pump pressure is not reduced by the sudden rush of fluid for reciprocating the piston, and consequently the chucks which are in working position are constantly maintained closed.

In the form illustrated, the discharge pipe 248 having branches 249 and 124 (the latter when required) delivers pressure fluid to a passage 250 (Figs. 23 and 24) in what may be termed a valve block 251 mounted on the frame of the machine. The fluid in passage 250 in order to pass therethrough must build up to a sufficient pressure to raise the valve plug 252 fitting in the seat 253. An adjustable spring 254 urges the valve plug 252 downwardly so that by adjusting the spring 254 by means of the screw plug 255 it is possible to adjust the pressure at which the valve plug 252 will be moved to open position as shown in Fig. 23. Thus, before the plug 252 opens the passage, the pressure in the discharge line 248 and consequently in the communicating branch line 249 must build up to at least the pressure determined by the adjustment of the spring 254. From the passage 250 and valve passage 253, the pressure fluid passes through a transverse passage 256, through passage 257 fitting 258 (Fig. 21), and into the accumulator or air bell chamber 259. A passage 260 formed in the valve block permits fluid to pass either from the accumulator or directly from the passage 256 to a passage 261 communicating with a pipe 262 which leads to the manual or other control valve 263 for a purpose to be described. An air cushion in the chamber 259 permits a storage of a considerable quantity of fluid under pressure, which fluid is available for reciprocation of the piston and draw rod controlling the chuck in loading position. When a predetermined pressure has been built up in the accumulator chamber 259, excess fluid entering through the pipe 248 serves to build up pressure in the passage 260 and valve passage 264 so as to raise the relief valve plug 265 against the spring 266. The spring 266, by means of the plug 267, may be set to permit the valve plug 265 to open at any predetermined pressure. Such excess pressure fluid then passes through the passage 268, passage 269, and pipe 270, either back to the sump or preferably to such points as desired where it may discharge and spill over certain working parts for lubricating the same. It is desirable that this excess fluid from the pressure relief line 270 should discharge over such working parts as are above or in communication with the sump chamber 247 in the main frame so that all excess fluid will be drained to the sump.

As stated, the pipe 262, which is in open communication with the accumulator chamber 259, is connected to the control valve 263. From the control valve 263, a pipe 271 leads to the passage 243 which in turn communicates with the short circumferential passage 240 in the distributor block 233 which passage is in line with the extended passage 239 as heretofore described. Another pipe 272 communicates with the valve 263 and with the passage 244 which in turn communicates with the offset circumferential passage 241 in the distributor block 233. Another pipe 273 leads from the control valve 263 and communicates either directly with the sump or leads exhaust fluid from the valve to a point where it is spilled over working parts to be lubricated as heretofore described in connection with the relief pipe 270.

The operation of the hydraulic chucking system 10 is as follows:

When the pump 18 is started, fluid pressure builds up in the discharge line 248 and direct connected branch line 249, which, as stated, ultimately communicates with the extended passage 239 in the distributor block 233. The passage 239 is of such extent and is positioned circumferentially so that the passages such as 237 (Fig. 18) in the ring 232 corresponding to each of the cylinders, except the one in the loading position, will be under high fluid pressure, and such fluid pressure will be transmitted to the tail end of the cylinders 112 and all of the chucks (except that in the loading position) will be maintained closed. When the turret indexes so as to bring one chuck each time into the loading position (Fig. 15), the passage 237 in the ring 232 will leave communication with the extended passage 239 and will then pass over the ungrooved portion of the distributor block 233 and will finally be stopped in the loading position with the passage 237 in communication with the short circumferential passage 240. This passage, it will be remembered, is in communication with the passage 243 and pipe 271. The other passage 238 (of the cylinder in loading station) leading to the head end of the cylinder will then be in communication with the short circumferential passage 241 which, as heretofore described, is in communication with the passage 244 and pipe 272. Thus, with the control valve in the position shown in Fig. 21, the fluid in the tail end of the cylinder may escape through passage 237, passages 240—243, and pipe 271, through the valve 263 and into the exhaust pipe 273. At the same time, pressure fluid from the accumulator chamber 259 will pass through pipe 262, valve 263, into pipe 272, through passage 244, passage 241, and into passage 238, and thence to passage 229 (Fig. 17) into the head end of the cylinder in loading position so as to move the draw rod 225 forwardly to open the chuck. A new work-piece may then be inserted in the chuck and the valve 263 moved to opposite position so as to cause the pipe 262 to communicate with pipe 271, passage 243, passage 240, passage 238 and cylinder passage 228 and the tail end of the cylinder to again close the chuck. During this closing movement, the passage 241 communicating with the head end of the cylinder will be in communication through passage 244, pipe 272, and valve 263, with the exhaust pipe 273. After the chuck has been closed, the turret again indexes to cause the chuck which has just been closed to again index into working position and be driven by the chain as heretofore described. During indexing of the lately closed chuck, the passage 237 passes from communication with the passage 240 over the ungrooved portion 274 of the distributor block 233 until it again comes into open communication with the extended passage 239 which is under direct pump pressure and which serves to hold that chuck closed while in all subsequent operating positions. During the relatively quick passage over the ungrooved portion 274 of the distributor block 233, there will be substantially no loss of pressure in the tail end of the cylinder and consequently the chuck will remain closed until it is put into communication with the extended passage 239 where the tail end of the cylinder is subjected to direct pump pressure as heretofore described, and will be held tightly closed. Each subsequent chuck as it indexes into the loading position will go through the cycle just described. For simplicity, we have indicated a hand operated valve on the machine as adapted for hand chucking. Clearly, automatic loading and valve operation could be employed.

We have provided simple means for permitting any chuck to be opened when in any indexed position. Such means may be in the form of a by-pass valve plug 275 (Figs. 17 and 20) which may be pressed by a spring 276 into tight engagement with its valve bore. The valve plug is provided with a transverse passage 277 which when turned at right angles to the positions shown in Figs. 17 and 20 would open communication through passages 278 and 279 at opposite sides of the piston in the cylinder. Thus, with unit pressure equalized on both sides of the piston, the chuck would be opened by the excess of total pressure on the head end of the piston over that acting on the tail end because of the lesser effective area of the tail end. The provision of means for quickly opening a chuck in any working position is often of great advantage in a machine of the character indicated.

In our improved chuck actuating system, we may omit stuffing boxes and utilize any oil escaping from the system for lubricating working parts. It will be seen that there is merely a running fit between the distributor block 233 and the ring member 232. There is also merely a running fit between the cylinder head 226 and the ring 232. The piston rod where it passes through the cylinder may be provided with sealing grooves 280 and the leakage past the piston rod passes into the hollow spindle and may escape as through a passage 281 to the outside of the sprocket 111 for lubricating the latter and the chain. Lubricant escaping into the supporting stem means 10 may enter the central bore therethrough through one or more radial holes 282 and then pass along such bore into radial hole 139 (Fig. 5) into the chambered portion 138 of the tool slide for lubricating the bearing of the latter on the supporting stem. The lubricant may likewise pass along the outside of the stem 10 for lubricating the bearings 64—65. The lubrication points herein described are merely illustrative, and it will be clear to those skilled in the art that substantially all parts of the machine may be thus lubricated. The oil in the hydraulic system is preferably distinct from the cutting oil usually employed, which latter after leaving the work and tools passes into a sump chamber 283 in the base of the machine, preferably beneath the sump chamber 247 for the chuck and lubricating oil.

General operation

The operation of the machine as herein disclosed is as follows:

The motor is started and the pump 18 consequently set in operation, and through the power unit in casing 8 the spindle drive shaft 42 rotates all of the spindles in work stations, but as shown particularly in Fig. 15 that spindle in the loading station is not rotated. A work-piece is inserted in the chuck in the loading station, and the control valve 263 (Figs. 1 and 21) is turned so as to chuck the work-piece as heretofore described in connection with the hydraulic system. The fast traverse clutch is then thrown in by moving the fast traverse handle 174 toward the left as viewed in Figs. 1 and 11. This throwing in of the fast traverse clutch is permitted even though the cam as 216 (Fig. 11) is in contact with the roller 218 by reason of the flexibility of the spring 221. Through the mechanism heretofore described, the fast traverse clutch 27 is engaged with its operating clutch part of worm wheel 21, and the main feed cam shaft 35 is set in operation. The locking arm 86 is withdrawn and the spindle carrier is indexed by the indexing arm 71 as heretofore described so as to move the chuck just loaded into a work station and to bring another chuck from the last work station to the loading station. The chuck just loaded when it reaches the first work station will be held tightly closed and will remain tightly closed in each of the subsequent work stations by reason of the direct pump pressure fluid in the extended groove 239 (Fig. 21) of the distributor block 233. The cam drum 16 will then act upon the draw rod 15 to jump the main tool slide 13 to working position and to jump the oscillating tool carriers 140—141 to working positions. The auxiliary cam shaft 148 at this time will have rotated so as to cause the cam 210 to release the slow traverse clutch 49 and the fast traverse clutch is automatically thrown out by the arm 219 actuated by the cam 223. The tools will then perform appropriate operations on the work-pieces in all chucks in work stations. After the tools have performed their operations, the fast traverse clutch previously thrown out by the cam 223 will be again thrown in by the cam 216. The cam shafts under the influence of the fast traverse will be moved at a rapid rate and the tool slide 13 and oscillating tool carriers 140—141 will then be retracted and after such retraction the locking arm 86 will again be released and the turret indexed so as to bring the chuck from the last working station to the loading station. A cam such as 224 will then throw out the fast traverse clutch, and since the slow traverse clutch has been previously or at that time thrown out by the cam 210, the feed functions will cease and one cycle will have been completed. The chuck just brought into the loading station, which, after the machine is in normal operation, will hold a finished work-piece, is then unloaded by movement of the control valve 263 so as to open the chuck and permit removal of a finished work-piece. A new work-piece is then chucked as heretofore described, the fast traverse clutch again thrown in, and the machine proceeds to complete another cycle as heretofore.

It will be seen that the machine herein disclosed will be simple and of sturdy construction. The work and the tools are rigidly held or guided and are moved relatively to each other with great accuracy. The spindle carrier is mounted for easy indexing and yet is positively held to resist thrusts and movement in any direction. The various working parts are well lubricated preferably by leakage and discharge from the hydraulic system.

While a preferred form of the invention has been described in considerable detail, it is to be understood that the principles of the invention are applicable to machines of other types and that various modifications, omissions, and additions may be made without departing from the spirit and scope of the invention as defined in the appended claims.

We claim:

1. In a metal working machine, a frame, a central stem having spaced apart bearings in said frame, a work carrier and a tool carrier both mounted on said central stem between said bearings, one of said carriers being fixedly mounted on said stem and the other of said carriers being longitudinally slidable on said stem toward and from said other carrier, means for indexing said central stem and carrier fixedly carried thereon, and means for cramping one of said indexable parts into rigid supporting engagement with the frame between indexing movements.

2. In a metal working machine, a frame, a work carrier and a tool carrier, central stem portions extending from opposite sides of one of said carriers, bearings on said frame for sustaining said stem portions, one of said bearings constituting a thrust bearing to resist end movement of said stem portion, means for sliding one of said carriers longitudinally of one stem portion at one side of said other carrier, means for indexing one stem portion with one of said carriers, and means for cramping one of said indexable parts into rigid supporting engagement with the frame between indexing movements.

3. In a metal working machine, a frame having spaced apart bearings, a work carrier and a tool carrier, stem portions projecting from opposite sides of one of said carriers and mounted in said spaced apart bearings, said other carrier being slidably mounted upon one stem portion, means for sliding said carrier, means for indexing one of said carriers relatively to the other, and means for cramping said indexable carrier into rigid supporting engagement with the frame between indexing movements.

4. In a metal working machine, a frame, a work carrier and a tool carrier, one of said carriers having stem portions projecting from opposite sides thereof, the other of said carriers being mounted on one of said stem portions, bearings on said frame for said stem portions, one of said carriers being movable relatively to the other longitudinally of said stem portions, means for indexing one of said carriers relatively to the other, said indexable carrier being sustained by said stem portions out of bearing contact with said frame during indexing of said indexable carrier.

5. In a metal working machine, a frame, a carrier having stem portions projecting centrally at opposite sides thereof, a second carrier slidably mounted on one of said stem portions, spaced apart bearings for said stem portions, said carriers being located intermediate said bearings, means for indexing one of said carriers relatively to the other, said indexable carrier being supported by said stem portions out of bearing contact with said frame during indexing of said indexable carrier, and means for moving a part of said frame and a part of said indexable carrier into bearing supporting engagement with each other between indexing movements of said indexable carrier.

6. In a metal working machine, a frame, an indexable carrier having step portions projecting at opposite sides thereof, bearings for supporting said stem portions at opposite sides of said indexable carrier, said indexable carrier being supported by said stem portions out of bearing contact with said frame during indexing movements of said carrier, and means for moving said indexable carrier into supporting bearing engagement with a part of said frame.

7. In a metal working machine, a frame, a carrier having stem portions extending centrally thereof at opposite sides, bearings for the stem portions at opposite sides of said carrier, said carrier at times being supported by said stem portions out of bearing contact with said frame, and means for moving said carrier into supporting bearing contact with a part of said frame.

8. In a metal working machine, a frame, a carrier having stem portions projecting centrally at opposite sides thereof, bearings for said projecting stem portions, said carrier being supported by said stem portions out of bearing contact with said frame, and wedging means for moving said carrier transversely of said central stem portions into bearing supporting engagement with said frame.

9. In a metal working machine, a frame, a carrier having stem portions projecting from opposite sides thereof, bearings for said stem portions, spaced apart supporting means on said frame and at times out of contact with said carrier, and means for moving said carrier into bearing supporting contact with said spaced apart supporting means.

10. In a metal working machine, a frame, a carrier having stem portions projecting centrally at opposite sides thereof, bearings for said stem portions, a carrier support on said frame and adjustable toward and from said carrier and being at times slightly spaced from said carrier, and means for moving said carrier into bearing supporting engagement with said carrier support.

11. In a metal working machine, a frame, a carrier having stem portions at opposite sides thereof, bearings for said stem portions at opposite sides of said carrier, said carrier being supported at times by said stem portions out of supporting contact with said frame, and means for moving said carrier in a direction transversely of said stem portions into bearing supporting engagement with a part of said frame.

12. In a metal working machine, a frame, a carrier having stem portions extending from opposite sides thereof, bearings for said stem portions, a part of said carrier having locking notches therein, locking bolts for engagement with said notches, one of said notches and adjacent locking bolt being formed to urge said carrier into supporting engagement with said frame.

13. In a metal working machine, a frame, a carrier having stem portions extending from opposite sides thereof, bearings for said stem portions, adjustable carrier supporting means on said frame, said carrier being supported at times by said stem portions out of supporting contact with said carrier supports, and locking means for said carrier for locking the same against rotation and urging the carrier into supporting bearing engagement with said carrier supporting means.

14. In a metal working machine, a frame, a movable carrier, means for supporting said carrier out of bearing supporting engagement with said frame, and means for urging said carrier transversely of its axis of movement into supporting bearing engagement with said frame.

15. In a metal working machine, an indexable carrier having peripheral locking slots therein, locking bolts for engagement with said slots at opposite sides of said carrier and located substantially in the same plane transverse to the axis thereof, a relatively light spring for urging one of said locking bolts into its locking slot, a heavy spring for urging the other of said locking bolts into engagement with its locking slot, power means for moving said last mentioned locking bolt against said heavy spring and out of engagement with its slot, one of said locking bolts and corresponding slots being formed to wedge said carrier in a direction transversely of its axis of rotation.

16. In a metal working machine, a frame, a spindle carrier having stem portions extending from opposite sides thereof, antifriction bearings for supporting said stem portions, a tool slide slidably mounted on one stem portion intermediate said bearings, means for indexing said spindle carrier and one stem portion, means for moving said tool slide longitudinally on its stem portion, said tool slide and said frame having abutment means for preventing rotation of said tool slide relatively to said frame.

17. In a metal working machine, a frame, a spindle carrier having projecting stem portions at opposite sides thereof, antifriction bearings for said stem portions at opposite sides of said spindle carrier, at least one of said bearings serving as a thrust bearing to resist end thrust, a plurality of work carrying spindles rotatably carried by said spindle carrier, means for rotating said spindles, means for indexing said spindle carrier and said stem portions, locking means for preventing rotation of said spindle carrier between indexings and for drawing said spindle carrier into tight supporting bearing engagement with a part of said frame, a tool slide slidably mounted on one of said stem portions at one side of said spindle carrier, means for sliding said tool slide toward and from said spindle carrier, said tool slide and said frame having abutment means for preventing rotation of said tool slide relatively to said frame.

18. In a metal working machine, a frame, a spindle carrier having projecting stem portions at opposite sides thereof, a plurality of rotary work carrying spindles carried by said spindle carrier, means for rotating said spindles, means for indexing said spindle carrier, means for locking said spindle carrier against rotation between indexings, a tool slide slidably mounted on one of said stem portions and between said bearings, means for moving said tool slide toward and from said spindle carrier, abutment means between said frame and tool slide for preventing rotation of the latter, a cross tool carrier mounted on said frame, and means for actuating said tool carriers.

19. In a metal working machine, a stem, a carrier thereon, said carrier having a protecting hood thereon and means beneath said hood for preventing rotation of said carrier but permitting sliding thereof longitudinally of the axis of said stem, and means for moving said carrier in a direction longitudinally of the axis of said stem.

20. In a metal working machine, a frame, a slide, a hood on said slide, and means beneath said hood including hardened wear blocks between said frame and hood for guiding said slide in its sliding movements and preventing rotation thereof.

21. In a metal working machine, a frame, a slide, a hood member, and means beneath said hood member for preventing rotation of said hood and guiding the slide in its sliding movement.

22. In a metal working machine, a frame, a stem supported by said frame, a slide mounted on said stem, said slide having a rearwardly extending hood portion, means beneath said hood portion for preventing rotation of said slide but permitting longitudinal sliding movement thereof, and means for moving said slide longitudinally.

23. In a metal working machine, a frame, a stem carried by said frame, a slide on said stem, a hood member on said slide, means beneath said hood for preventing rotation but permitting longitudinal sliding of said slide, and a draw rod secured to said hood and extending through said stem for moving said slide.

24. In a metal working machine, a frame, a casing mounted on said frame, a motor mounted on said frame adjacent said casing, a motor shaft extending from said motor and horizontally into said casing, a pair of horizontal shafts in said casing extending at right angles to said motor shaft, means for driving said pair of shafts from said motor shaft, a spindle drive shaft extending horizontally into said casing at right angles to said motor shaft, change gears between said spindle drive shaft and one of said pair of shafts for driving said spindle shaft, a vertical shaft in said casing, means including change gears for driving said vertical shaft from said spindle drive shaft, and means within said casing for driving said vertical shaft from the other of said pair of shafts.

25. In a metal working machine, a frame, a gear casing mounted on said frame, a primary drive shaft in said casing and having worm means thereon, a worm wheel shaft in said casing and having a worm wheel thereon to be driven by said worm means, a cam drive shaft, means for driving said cam drive shaft from said worm wheel shaft, a second worm wheel shaft in said casing and having a worm wheel thereon to be driven by said worm means, and means including change gears for driving said cam drive shaft from said last mentioned worm wheel shaft.

26. In a metal working machine, a frame, a gear casing mounted on said frame, a primary drive shaft in said casing, a spindle drive shaft in said casing, means including gearing within said casing and change gears on the outside of said casing for driving said spindle drive shaft from said primary drive shaft, a worm on said spindle drive shaft, a cam drive shaft, and gear means for driving said cam drive shaft from said worm on said spindle drive shaft.

27. In a metal working machine, a frame, a gear casing mounted on said frame, a primary drive shaft in said casing, a pair of shafts in said casing, means for driving said pair of shafts from said primary shaft, a cam drive shaft having a part extending into said casing, means including a clutch for driving said cam drive shaft from one of said pair of shafts, means including change gears on the outside of said casing, and a clutch for driving said cam drive shaft from the other of said pair of shafts.

28. In a metal working machine, a work carrier, a tool carrier, manually operable means for feeding the same relatively to each other, power means including a clutch for feeding the same relatively to each other, a pair of concentric shafts extending through said frame from the front to the rear thereof, one of said shafts having a handle at the front and a handle at the rear of the machine for hand feeding, the other of said shafts having means at the front and means at the rear of said machine for throwing said power feed clutch.

29. In a metal working machine of the station type, a plurality of chucking devices, fluid pressure actuated means for operating said chucking devices, a fluid pressure pump, a fluid pressure accumulator device connected to said pump, a control valve, means affording constantly open communication between the discharge side of said pump and the fluid pressure actuated devices of some of said chucking devices, and means including said control valve for serially connecting each of said fluid pressure chucking devices to exhaust and to said fluid pressure accumulator device.

30. In a metal working machine, a plurality of chucking devices, fluid pressure actuated means for operating said chucking devices, a fluid pressure pump, at least one of said chucking devices being in constant open communication with the discharge of said pump, a fluid pressure accumulator for storing pressure fluid from the discharge side of said pump, and means for serially connecting the fluid pressure actuated means to said accumulator and to exhaust.

31. In a metal working machine, a plurality of chucking devices, fluid pressure actuated means for actuating said chucking devices, a pump and an accumulator connected to the discharge side of said pump, and an open connection to one of said chucking devices from a point between the discharge side of said pump and said accumulator.

32. In a metal working machine, a plurality of fluid pressure actuated chucking devices, a pump, an accumulator connected to the discharge side of said pump, a pressure fluid distributor, means for connecting said fluid pressure actuated chucking devices to said distributor, a constantly open connection to said pressure fluid distributor from a point between the discharge side of said pump and said accumulator, whereby pump pressure is constantly supplied to said distributor, and valve controlled means for connecting said distributor to said accumulator.

33. In a metal working machine, a plurality of fluid actuated chucking devices, a pressure fluid distributor, means for connecting said fluid actuated chucking devices to said distributor, fluid passage means for simultaneously connecting a plurality of said fluid pressure chucking devices to a part of said distributor under one pressure, and means for relatively moving said distributor and fluid pressure actuated chucking devices to serially disconnect each said chucking device from said first mentioned passage means and means to connect each of said chucking devices serially to exhaust and to chucking pressure.

34. In a metal working machine, a plurality of fluid pressure chucking devices, a pressure fluid distributor including a member having an annular passage in constant communication with a plurality of said chucking devices, means for connecting said passage to a source of fluid pressure, said distributor having a pair of passages to be serially connected with each of said chucking devices after the latter have been disconnected from said first mentioned annular passage, and valve means for alternately connecting said pair of passages with a source of fluid pressure and with exhaust.

35. In a metal working machine, a plurality of fluid pressure chucking devices, fluid pressure distributing means for said chucking devices, said distributing means including a pair of relatively movable members in contact with each other having one passageway therebetween in normal communication with a plurality of said chucking devices to hold the latter closed, said distributing means having a pair of passages to be serially connected to each chucking device after each said chucking device has been removed from communication with said first mentioned passage, and means for alternately connecting said pair of passages with a source of fluid pressure and with exhaust.

36. In a metal working machine, a frame, a plurality of fluid pressure actuated chucking devices, a distributor block secured to said frame, a coacting distributor ring movable with said chucking devices, means for moving said ring and block relatively to each other, one of said distributor members having a passage in constant communication with a plurality of said chucking devices to maintain the chucks thereof closed, one of said members having passages to be serially connected with each of said chucking devices, and means for alternately connecting said last mentioned passages with a source of pressure fluid and with exhaust.

37. In a metal working machine, a plurality of rotatable spindles, chucks carried by said spindles, means for indexing the same, fluid pressure actuated means for operating said chucks, means for constantly connecting all but one of said fluid pressure actuated means with a source of fluid pressure to maintain said chucks closed, means for connecting the other of said fluid pressure actuated devices alternately with exhaust and with a source of fluid pressure, said fluid pressure chucking devices being moved during indexing to serially open and close each said chucks as aforesaid.

38. In a metal working machine, a chucking device, fluid pressure actuated means for operating the same, a fluid pressure pump, a fluid pressure accumulator connected to the discharge side of said pump through a loaded check valve to open under predetermined pressure of fluid from said pump, a fluid pressure line connected to the discharge side of said pump between the latter and said check valve, and another fluid pressure line connected with said accumulator beyond said check valve, said lines being connected to said fluid pressure actuated means for the purpose described.

39. In a metal working machine, a chucking device, fluid pressure actuated means for operating the same, a fluid pressure pump, an accumulator connected to the discharge side of said pump for storing fluid under pressure from said pump, a loaded check valve to prevent entry of pressure fluid from said pump to said accumulator until a predetermined pressure is built up by said pump, means for leading fluid from said fluid actuated means to exhaust and from said accumulator to said fluid pressure actuated means whereby said device may be actuated solely by pressure fluid from said accumulator, and means for connecting the discharge side of said pump at a point between the latter and said accumulator with said fluid pressure actuated means whereby the latter is subjected to full pump pressure only after it has been actuated by pressure fluid from said accumulator.

40. In a metal working machine, a chucking device, fluid pressure actuated means for operating the same, means for conducting pressure fluid to and from said fluid pressure actuated means, and means for utilizing fluid pressure leaking from said fluid pressure actuated means and exhausting therefrom for lubricating working parts of said machine.

41. In a metal working machine, a frame, a chucking device, fluid pressure actuated means for operating the same, means for conducting pressure fluid to said fluid pressure actuated means, means for exhausting pressure fluid therefrom and leading such fluid to working parts of said machine for lubricating the same, said frame being constructed to confine pressure fluid exhausted from said fluid pressure actuated device and return the same to the sump.

42. In a metal working machine, a frame, a spindle rotatably mounted therein and carrying a chuck, a fluid pressure piston and cylinder for actuating said chuck, a draw rod extending from said chuck to said piston and cylinder, means for leading pressure fluid to and from said cylinder, and means for conducting a part of the pressure fluid leaking from said cylinder to a part of said spindle for lubricating the same.

43. In a metal working machine, a plurality of fluid pressure actuated chucking devices including cylinders and pistons therein, means for constantly maintaining pressure fluid on at least one of said pistons, each said cylinder having a passageway connecting the ends thereof at opposite sides of said piston, and a manually operable valve therein for opening and closing said passage at will, for the purpose described.

44. In a metal working machine, a plurality of chucks, indexable successively into working position, a fluid pressure cylinder for each chuck, a piston therein for actuating each chuck, means for normally constantly maintaining a high unbalanced pressure on said piston of each chuck while each chuck is in working position and auxiliary valve means for relieving the high unbalanced pressure on each said piston when in working position, whereby each chuck may be actuated while in working position.

45. In a metal working machine, an indexable carrier, a plurality of chucking devices carried by said indexable carrier, a fluid pressure cylinder for each of said chucking devices, a piston in each of said cylinders for actuating said chucking devices, means for maintaining an unbalanced pressure on the pistons of said chucking devices in working position for maintaining said chucking devices closed, and auxiliary valve means for relieving such unbalanced pressure on any of said pistons in working position to permit any corresponding chucking device in working position to be opened.

46. In a metal working machine, a spindle carrier, a plurality of rotary spindles carried thereby, a chuck carried by each of said spindles, a fluid pressure cylinder for each of said chucks, a piston in each of said cylinders for actuating said chucks, means for maintaining a high unbalanced pressure on each of said pistons in working position for maintaining said chucks in working position closed, and auxiliary valve means for relieving such unbalanced pressure on any of said pistons in working position whereby any corresponding chuck may be opened.

47. In a machine of the character indicated, an indexable spindle carrier, a plurality of spindles rotatably mounted in said carrier, stem portions rigid with and projecting from opposite sides of said spindle carrier, and bearings for said stem portions at opposite sides of said carrier for indexably supporting said carrier and stem as a unit.

48. In a machine of the character indicated, an indexable spindle carrier, anti-friction bearing means for supporting said carrier, a frame part, and means for clamping said spindle carrier against a part of said frame and stressing said anti-friction bearing members.

49. In a machine of the character indicated, an indexable spindle carrier, anti-friction bearing means for supporting said carrier during indexing, and means for locking said carrier against rotative movement between indexing movements and for stressing said anti-friction bearings while said carrier is so locked.

50. In a machine of the character indicated, a spindle carrier, a plurality of work chucking devices carried thereby, and anti-friction bearing means for indexably supporting said carrier.

51. In a machine of the character indicated, a frame part, an indexable carrier, means for causing said carrier and frame part to be moved relatively to each other out of contact with each other during indexing of said carrier, and means for locking said frame part and carrier together and in contact with each other between indexing movements.

52. In a machine of the character indicated, an indexable carrier, a support for the same, means for moving said carrier and support out of engagement with each other during indexing movements of said carrier, and means for clamping said support and carrier in contact with each other between indexing movements.

53. In a machine of the character indicated, a frame, a carrier, means including rolling devices for moving said carrier and frame out of engagement with each other during indexing movements of said carrier, and means for clamping said carrier and frame in bearing supporting engagement with each other between indexing movements.

54. In a machine of the character indicated, a carrier, a frame part for supporting said carrier between indexing movements thereof, and means for moving said carrier out of supporting engagement with said frame during indexing movements for the purpose described.

55. In a machine of the character indicated, an indexable spindle carrier, and means for holding the same against rotative movement between indexing movements thereof, comprising a positioning device and a wedging device for wedging said carrier in a direction transversely of its axis of indexing, said positioning device and said wedging device being at opposite sides of said spindle carrier and substantially in the same plane at substantially right angles to the axis of indexing of said carrier.

56. In a machine of the character indicated, a plurality of chucks indexable successively from loading position to working position, fluid pressure actuated devices for each of said chucks, a source of high pressure fluid, a source of low pressure fluid, and means for constantly maintaining high pressure fluid on one of said chucks in one of said positions, and means for subjecting another of said chucks in the other of said positions to the pressure of the low pressure fluid.

57. In a machine of the character indicated, a plurality of chucks, a tool and means for indexing said tool and chucks relatively to each other to successively bring each chuck and said tool into relative working position, fluid pressure chucking devices for each of said chucks, a source of low pressure fluid, a source of high pressure fluid, means for connecting the fluid pressure actuated device of one of said chucks to said source of low pressure fluid for actuating said fluid pressure actuated device, and means for thereafter connecting said actuated fluid pressure actuated device to said source of high pressure fluid for the purpose described.

58. The method of actuating and holding a plurality of chucking devices of the character indicated which comprises actuating one of said devices by fluid under variable pressure while maintaining another chucking device under a substantially constant high pressure and thereafter sustaining said actuated device in actuated position by said substantially constant high pressure.

59. In a machine of the character indicated, a plurality of chucks, a tool, means for indexing said tool and chucks relatively to each other to successively bring said chucks and tool into relative working position, fluid pressure chucking devices for each of said chucks, a first source of pressure fluid, a second source of pressure fluid at a different pressure, means for connecting the fluid pressure actuated device of one of said chucks to one of said sources of pressure fluid for actuating said fluid pressure actuated device, and means for thereafter connecting said actuated fluid pressure device to said second source of pressure fluid at said different pressure for maintaining said actuated device in actuated position.

60. In a machine of the character indicated, an indexable carrier, a plurality of chucks thereon, fluid pressure actuated devices for each of said chucks, a first source of fluid pressure, means for connecting said source of pressure fluid with a fluid pressure actuated device of each said chuck when in loading position, a second source of pressure fluid at a different pressure, and means for connecting said second source of pressure fluid with said actuated fluid pressure actuated device for maintaining the latter in actuated position when the same indexes beyond loading position.

61. In a machine of the character indicated, an indexable carrier, a plurality of chucks carried thereby, fluid pressure actuated devices for each of said chucks, means for successively indexing said carrier to bring each said chuck into loading position, a source of pressure fluid, together with valve means for connecting said source of pressure fluid with the fluid pressure actuated device of each chuck when in loading position for actuating said chuck in loading position, a second source of pressure fluid, and means for connecting said second source of pressure fluid to the fluid pressure actuated device of each chuck after the same indexes from loading position to working position.

62. In a fluid pressure chucking device, a fluid pressure actuated means, a pump and an accumulator, conduit means connecting the discharge side of said pump to said accumulator, a loaded valve between the discharge side of said pump and said accumulator to open only upon the attainment of a predetermined pressure in said conduit means, a branch conduit means leading from said first mentioned conduit means at a point between said loaded valve and the discharge side of said pump, and means for connecting said last mentioned conduit means and said accumulator to said fluid pressure actuated device at different times.

63. In a machine of the character indicated, an indexable carrier, a plurality of chucking devices carried by said carrier, a frame part, means for moving said frame part and indexable carrier relatively to each other in a direction transverse to the axis of indexing of said carrier and verse to the axis of indexing of said carrier and into engagement with each other between indexing movements, and means for moving said frame part and indexable carrier relatively to each other out of engagement with each other during indexing movement of said carrier.

64. In a machine of the character indicated, an indexable carrier, a frame part, means for supporting said carrier out of contact with said frame part during indexing movement of said carrier, and means for moving said frame part and carrier relatively to each other in a direction transverse to the axis of indexing of said carrier into bearing supporting engagement with each other between indexing movements of said carrier.

65. In a machine of the character indicated, a carrier indexable about a horizontal axis, antifriction means for supporting said indexable carrier transversely of its axis of rotation during indexing movements thereof, a carrier supporting part for supporting said carrier transversely of its axis of indexing between indexing movements thereof, and means for urging said carrier and said supporting part into bearing supporting engagement with each other between indexing movements thereof.

66. In a metal working machine, an indexable carrier having peripheral locking slots therein, locking bolts for engagement with said slots at opposite sides of said carrier and located substantially in the same plane transverse to the axis thereof, spring means for urging said locking bolts into said locking slots, power means for moving at least one of said locking bolts against said spring means and out of engagement with its slot, one of said locking bolts and corresponding slot being formed to wedge said carrier in a direction transversely of its axis of rotation.

67. The combination, with two sources of liquid under pressure and a machine having a number of work-holding chucks movable from station to station, of a hydraulic chuck-operating mechanism comprising a cylinder and a piston connected to each of said chucks for operating the same, means for supplying liquid from one of said sources to said cylinders to hold said chucks closed, and means for supplying liquid from the other of said sources to the cylinder at one of said stations to open and close the chuck at that station without affecting the holding pressure in the cylinders at the other station.

68. The combination, with two sources of liquid under pressure and a machine having a number of rotatable work-holding chucks, of a hydraulic chuck-operating mechanism comprising a cylinder connected to each of said chucks, a piston arranged in each of said cylinders for operating said chucks, a single valve connected between said sources and said cylinders and controlling the flow of liquid to said cylinders, and means for moving said valve to one position to admit liquid from one of said sources to one end of each of said cylinders to actuate said pistons and close said chucks and for moving said valve to a second position to admit liquid from the same source to the other end of one of said cylinders to actuate the piston therein and open the chuck to which said cylinder is connected, and means for maintaining one end of each of said cylinders open to liquid from the other source to hold said chucks closed after the same have been closed.

69. A machine tool comprising a rotating indexable carrier, a housing for said carrier, carrier indexing means, means for clamping said carrier in its housing and means for supporting the weight of said carrier when it is freed from said clamping means which form a bearing on which the carrier rotates independent of contact with the housing.

70. A machine tool comprising a rotating indexable carrier, a housing for said carrier, carrier indexing means, means for clamping said carrier in its housing and yieldable means for supporting the weight of said carrier when it is freed from said clamping means which form a bearing on which the carrier rotates independent of contact with the housing.

71. A machine tool, comprising a carrier, a plurality of chucking devices carried thereby, a hollow stem fixed to and projecting from said carrier, means for indexing said carrier and stem as a unit, a non-rotatable tool slide slidably mounted on said stem, means for moving said slide on said stem comprising a member within said hollow stem, and connecting means between said member and said tool slide.

72. A machine tool, comprising a carrier having a plurality of chucking devices thereon, a hollow stem rigidly secured to and projecting from said carrier, a frame part spaced from said carrier and forming a bearing for said hollow stem at a point remote from said carrier, means for indexing said carrier and hollow stem as a unit, a non-rotatable tool slide slidably mounted on said stem between said carrier and said frame part, means for moving said tool slide on said stem comprising a member extending within said hollow stem and through said carrier, and connecting means between said member and said tool slide.

73. A machine tool, comprising a carrier having a plurality of chucking devices, a stem part rigid with said carrier and projecting axially from one side thereof, means for indexing said carrier and stem part as a unit, a non-rotatable tool slide slidably mounted on said stem part, means for moving said slide on said stem part comprising a bar member extending through said carrier, means of connection between said bar member and said tool slide, and means located at the side of said carrier opposite said stem part and cooperating with said bar member for moving the same to move said tool slide.

74. In a chucking mechanism, an indexable spindle carrier, a plurality of spindles carried thereby, a chuck on each spindle, a cylinder and piston for each said chuck and indexable therewith, a pair of passages leading to each said cylinder and indexable therewith, a single control valve common to all said cylinders and cooperable with the pair of passages leading to each said cylinder when each said cylinder is indexed into loading station, whereby the piston in each said cylinder while in loading station may be actuated by pressure fluid controlled by said single control valve, means for actuating said valve, open passage means to conduct fluid to each of said cylinders in work stations to hold chucks in work stations closed while the piston of said cylinder in loading station is being actuated by fluid controlled by said single control valve, said spindle carrier being indexable to successively bring each said cylinder and piston from work station to loading station.

75. In a chucking mechanism, an indexable carrier, a plurality of chucks indexable therewith, a piston and cylinder for each said chuck and indexable therewith, pressure connections to said cylinders, a single valve common to all said cylinders and cooperable with the pressure connections to each said cylinder when each cylinder indexes to the loading station, means for shifting said valve to open and close a chuck at will when in loading station, and means for constantly conducting pressure fluid to the cylinders in work stations to hold the chucks in work stations closed.

76. In a chucking mechanism, an indexable carrier, a plurality of chucks carried thereby and indexable therewith, a cylinder and piston for each said chuck and indexable therewith, means comprising a single control valve and passage means to said cylinders, said passage means to a plurality of said cylinders in work stations being in open communication with a source of pressure to hold said plurality of chucks in work stations closed, said passage means to another of said cylinders when indexed into loading station being under control of said single control valve whereby to actuate the chuck in loading station, each chuck and cylinder being indexable successively from a work station into loading station whereby each chuck when in loading station may be actuated by pressure fluid controlled by said single control valve.

77. In a machine of the character indicated, a plurality of work holding chucks movable from station to station, a fluid pressure actuated device for operating each of said chucks, means for supplying fluid at a holding pressure to the fluid pressure actuated devices of each of said chucks in work stations to hold said chucks closed, and means for supplying fluid at a different pressure to the fluid pressure actuated device of a chuck in loading station to operate said latter chuck, without affecting the holding pressure on the fluid pressure actuated devices of said chucks in work stations.

78. In a machine of the character indicated, a plurality of work holding chucks movable from station to station, a fluid pressure actuated device for operating each of said chucks, a pump constituting one source of pressure fluid, an accumulator connected to said pump and constituting a second source of pressure fluid, means for supplying pressure fluid from one of said sources to the fluid pressure actuated device of a chuck in work station to hold said chuck closed, and means for supplying pressure fluid from the other of said sources to the fluid pressure actuated device of a chuck in loading station for operating the latter chuck.

79. In a machine of the character indicated, a frame, an indexable spindle carrier, a plurality of work carrying spindles rotatably mounted therein, a common means surrounding said spindles and geared thereto for rotating the same, means for indexing said spindle carrier, means for supporting said spindle carrier out of bearing supporting engagement with said frame during indexing movements thereof, means for locking said spindle carrier in bearing supporting engagement with said frame between indexing movements thereof, a support for an end working tool, a support for a forming tool, said supports being located forwardly of said spindle carrier, and means located axially rearwardly of the face of said spindle carrier for actuating said tool supports.

80. In a machine of the character indicated, a frame, an indexable spindle carrier thereon, a plurality of rotatable spindles carried by said spindle carrier, a means for rotating said spindles, a stem secured to and indexable with said spindle carrier and projecting from the forward face thereof, a tool support for end working tools guided on said stem, actuating means for said end working tool support and extending to a point rearwardly of the forward face of said spindle carrier, means located rearwardly of the forward face of said spindle carrier for actuating said actuating means, a forming tool support, actuating means coacting therewith and extending axially rearwardly beyond the front face of said spindle carrier, and means located axially rearwardly of the front face of said spindle carrier for actuating said actuating means for said forming tool.

81. In a machine of the character indicated, a frame, an indexable spindle carrier thereon, a plurality of rotatable work carrying spindles in said spindle carrier, means for driving said spindles, an end working tool support, a forming tool support, and actuating means extending axially rearwardly of the front face of said spindle carrier for actuating said tool supports, and cams located axially rearwardly of the front face of said spindle carrier for actuating said actuating means.

82. In a machine of the character indicated, a frame, an indexable spindle carrier thereon, a plurality of rotatable spindles carried by said spindle carrier, means for driving said spindles, a plurality of rotatable bars mounted in said frame and extending both rearwardly and forwardly of the front face of said spindle carrier, forming tool supports mounted on said bars and adapted to support forming tools for simultaneous coaction with work carried by different spindles, means located rearwardly of the front face of said spindle carrier and coacting with said rotatable bars for rotatably moving the same, whereby said forming tool supports are moved, an end working tool support, an actuator extending rearwardly therefrom, and means located axially rearwardly of the front face of said spindle carrier and coacting with said actuator for actuating said end working tool support.

83. In a machine of the character indicated, a frame, an indexable spindle carrier thereon, a plurality of rotatable spindles carried by said spindle carrier, means for rotating said spindles, a plurality of swinging supports for forming tools, said forming tool supports being adapted to carry forming tools for coaction with work pieces in different spindles simultaneously, cam means located axially rearwardly of the front face of said spindle carrier for swinging said swinging tool supports, an end working tool support, and cam means for actuating said end working tool support.

84. In a machine of the character indicated, a frame, an indexible spindle carrier mounted thereon, a plurality of rotatable spindles carried thereby, means for rotating said spindles, means for indexing said spindle carrier, a plurality of swinging tool supports oscillatably mounted in said frame, means located axially rearwardly of the front face of said spindle carrier for swinging said swinging tool supports, said swinging tool supports being positioned for cooperation with different spindles simultaneously, an end working tool support, means located axially rearwardly of the front face of said spindle carrier for actuating said end working tool support, and means extending from said actuating means to said end working tool support.

85. In a machine of the character indicated, a frame having a generally upstanding transverse wall, a spindle carrier indexably mounted on said frame, the face thereof lying in the region of said generally upstanding wall, a plurality of rotatable spindles carried by said spindle carrier, means for rotating said spindles, means for indexing said spindle carrier, a plurality of swinging tool holders mounted in said frame for cooperation with a plurality of said spindles, means located rearwardly of said generally upstanding wall for swinging said tool holders, an end working tool support, and means located rearwardly of said generally upstanding wall for actuating said end working tool support.

86. In a machine of the character indicated, a frame, an indexable spindle carrier thereon, a plurality of rotatable spindles carried by said spindle carrier, means for indexing said spindle carrier, means for rotating said rotatable spindles, a stem extending from the front face of said spindle carrier, a tool support thereon, an actuator for said tool support comprising a member coacting therewith and extending axially rearwardly of the front face of said spindle carrier, a slide located axially rearwardly of the front face of said spindle carrier and connected to said member, and cam means located axially rearwardly of the front face of said spindle carrier and coacting with said slide for actuating the latter, forming tool supports, and means located axially rearwardly of the front face of said spindle carrier for actuating said forming tool supports.

87. In a machine of the character indicated, a frame having a generally upstanding transverse wall, an indexable spindle carrier on said frame and having the front face thereof substantially at said front wall, a plurality of rotatable spindles carried by said spindle carrier, means for rotating said spindles, a plurality of forming tool supports in front of said upstanding wall, said forming tool supports being positioned to hold forming tools for coaction with work in different spindles simultaneously, an end working tool support, and cams located axially rearwardly of said front wall, together with means coacting with said cams and with said forming and end working tool supports for actuating the latter.

88. In a machine of the character indicated, a frame, an indexable spindle carrier on said frame, a plurality of rotatable work carrying spindles in said carrier, means for rotating said spindles, a plurality of forming tool supports forwardly of the front face of said spindle carrier, said forming tool supports being positioned to hold forming tools for coaction with work in different spindles simultaneously, an end working tool support, and a plurality of cams located axially rearwardly of the front face of said spindle carrier, and means coacting with said cams and forming an end working tool support for actuating the latter.

89. In a machine of the character indicated, a frame, an indexable spindle carrier mounted thereon, a plurality of rotatable spindles carried thereby, means for rotating said spindles, a central cam shaft extending in an axial direction beneath said spindle carrier, a pair of shafts in alignment with said first mentioned shaft and located respectively toward the front and back sides of said frame, whereby said last mentioned shafts and parts carried thereby may be easily accessible from the front and back sides of said frame, gear means for driving all of said shafts in unison, front and back forming tool supports, cam means on said pair of shafts, and follower means interposed between said cam means and forming tool supports for actuating the latter.

90. In a machine of the character indicated, a frame, an indexable spindle carrier mounted thereon, a plurality of rotatable spindles carried thereby, means for rotating said spindles, a pair of cam shafts extending parallel to the axis of said spindle carrier and located adjacent the front and back sides of said frame, whereby said shafts and parts carried thereby will be readily accessible from said sides of said frame, forming tool supports, cam means on said shafts for actuating said forming tool supports, and means for driving said shafts.

91. In a machine of the character indicated, a frame, an indexable spindle carrier mounted thereon, a plurality of rotatable spindles carried thereby, means for rotating said spindles, a pair of cam shafts, another shaft, all of said shafts being parallel to each other and extending parallel to the axis of said spindle carrier, means for gearing all of said shafts together and driving all of said shafts in unison, forming tool supports, and means for actuating the same including said pair of shafts, said pair of shafts and said another shaft being located at different levels, and means actuated by one of said shafts for indexing said spindle carrier.

92. In a machine of the character indicated, a frame, an indexable spindle carrier mounted thereon, a plurality of rotatable spindles carried thereby, means for rotating said spindles, a pair of rotatable tool bars each supported by said frame at spaced apart points longitudinally of said bars, forming tool supports carried by said bars intermediate the supporting points on said frame, and means for rotatably moving said bars for actuating said tool supports, for the purpose described.

93. In a machine of the character indicated, a frame, an indexable spindle carrier mounted thereon, a plurality of rotatable spindles carried thereby, means for rotating said spindles, a stem secured to and indexable with said spindle carrier and projecting from the forward face thereof, a tool support slidably mounted on said stem, a rotatable bar supported by said frame at spaced apart points longitudinally of said frame, a forming tool support carried by said bar, a follower arm on said rotatable bar, a cam shaft having cam means coacting with said follower arm for rotatably moving said bar to move said forming tool support, a second cam shaft having cam means for actuating said tool support on said stem, said cam shafts being parallel to each other and to the axis of indexing of said spindle carrier.

94. In a machine of the character indicated, a frame, an indexable spindle carrier mounted thereon, a plurality of rotatable spindles carried thereby, means for rotating said spindles, a pair of shafts extending longitudinally of said spindle carrier and located therebeneath, means for driving said shafts in unison, said shafts being located out of axial alignment with each other and in spaced apart horizontal planes, a forming tool support, an end working tool support, means actuated by one of said shafts for actuating said forming tool support, and means actuated by the other of said shafts for actuating said end working tool support.

95. In a machine of the character indicated, a frame, an indexable spindle carrier mounted thereon, a plurality of rotatable spindles carried thereby, means for rotating said spindles, a pair of cam shafts extending in a direction parallel to the axis of said spindle carrier, one of said shafts being located adjacent the front side wall of said machine, the other of said shafts being located adjacent the rear side wall of said machine, cams carried by both of said shafts, front and rear forming tool supports, means connecting said cams and forming tools whereby the latter may be actuated by said cams, and means for driving said cam shafts.

96. In a machine of the character indicated, a frame, an indexable spindle carrier carried thereby, a plurality of rotatable spindles carried by said spindle carrier, means for rotating said spindles, said frame having a generally upstanding wall in the general region of the front face of said spindle carrier, forming tool supports at the front and back sides of said frame for carrying tools to simultaneously coact with work in a plurality of said spindles, and cam means directly behind said forming tool supports and separated therefrom by said generally upstanding wall, and means connecting said cam means and said forming tool supports whereby the latter may be actuated by said cam means.

GEORGE O. GRIDLEY.
     DONALD H. MONTGOMERY.
     EARL WHEELER.